(12) United States Patent
Wigdor et al.

(10) Patent No.: US 9,836,313 B2
(45) Date of Patent: Dec. 5, 2017

(54) LOW-LATENCY VISUAL RESPONSE TO INPUT VIA PRE-GENERATION OF ALTERNATIVE GRAPHICAL REPRESENTATIONS OF APPLICATION ELEMENTS AND INPUT HANDLING ON A GRAPHICAL PROCESSING UNIT

(71) Applicant: Tactual Labs Co., New York, NY (US)

(72) Inventors: Daniel Wigdor, Toronto (CA); Steven Leonard Sanders, New York, NY (US); Ricardo Jorge Jota Costa, Toronto (CA); Clifton Forlines, Toronto (CA)

(73) Assignee: Tactual Labs Co., New York, NY (US)

( * ) Notice: Subject to any disclaimer, the term of this patent is extended or adjusted under 35 U.S.C. 154(b) by 347 days.

(21) Appl. No.: 14/614,173

(22) Filed: Feb. 4, 2015

(65) Prior Publication Data

US 2015/0220216 A1    Aug. 6, 2015

Related U.S. Application Data

(60) Provisional application No. 61/935,674, filed on Feb. 4, 2014.

(51) Int. Cl.
*G06F 3/0481* (2013.01)
*G06F 9/44* (2006.01)
(Continued)

(52) U.S. Cl.
CPC ........ *G06F 9/4443* (2013.01); *G06F 3/03545* (2013.01); *G06F 3/0482* (2013.01);
(Continued)

(58) Field of Classification Search
CPC .. G06F 9/4443; G06F 3/0482; G06F 3/04847; G06F 3/0485
See application file for complete search history.

(56) References Cited

U.S. PATENT DOCUMENTS

| | | | | | |
|---|---|---|---|---|---|
| 4,373,722 | A | * | 2/1983 | Kite | .......................... A63F 9/24 463/35 |
| 2006/0109259 | A1 | * | 5/2006 | Ohta | ..................... G06F 3/0485 345/173 |

(Continued)

*Primary Examiner* — Kevin L Young
*Assistant Examiner* — Seth A Silverman
(74) *Attorney, Agent, or Firm* — Adam B. Landa

(57) ABSTRACT

A method for providing a visual response to input with reduced latency in a computing device includes computing alternative sets of intermediate data for a first graphical user interface element, each alternative set of intermediate data comprising data useful to produce a visual representation of the graphical user interface element. The plurality of alternative sets of intermediate data and a set of intermediate data for a second graphical user interface element are stored in memory. The method creates an index identifying a first one of the plurality of alternative sets of intermediate data for the first graphical user interface element to use in forming a final pixel image. The index, the first set of alternative intermediate data for the graphical user interface element, and the intermediate data for the second graphical user interface element are used to create a first final pixel image for display to a user, the first final pixel image including the first and second graphical user interface elements. In response to user input, the index is modified to include an identification of a second one of the plurality of alternative sets of intermediate data for the first graphical user interface element, and the modified index is used to create a final pixel image for display to a user.

91 Claims, 20 Drawing Sheets

(51) Int. Cl.
*G06F 3/0482* (2013.01)
*G06F 3/0485* (2013.01)
*G06F 3/0488* (2013.01)
*G06F 3/0484* (2013.01)
*G06F 3/0354* (2013.01)

(52) U.S. Cl.
CPC ........ *G06F 3/0485* (2013.01); *G06F 3/04847* (2013.01); *G06F 3/04883* (2013.01)

(56) References Cited

U.S. PATENT DOCUMENTS

| | | | | |
|---|---|---|---|---|
| 2010/0277505 A1* | 11/2010 | Ludden | ................. | G06F 3/0416 345/634 |
| 2012/0293558 A1* | 11/2012 | Dilts | ........................ | G09G 5/24 345/676 |
| 2013/0174070 A1* | 7/2013 | Briand | ................. | G06F 3/0486 715/769 |

* cited by examiner

LOW-LATENCY VISUAL RESPONSE TO INPUT VIA PRE-GENERATION OF ALTERNATIVE GRAPHICAL REPRESENTATIONS OF APPLICATION ELEMENTS AND INPUT HANDLING ON A GRAPHICAL PROCESSING UNIT

This application is a non-provisional of and claims priority to U.S. Provisional Patent Application No. 61/935,674 filed Feb. 4, 2014, the entire disclosure of which is incorporated herein by reference.

This application relates to user interfaces such as the fast multi-touch sensors and other interfaces disclosed in U.S. patent application Ser. No. 14/046,823 filed Oct. 4, 2013 entitled "Hybrid Systems And Methods For Low-Latency User Input Processing And Feedback," U.S. patent application Ser. No. 13/841,436 filed Mar. 15, 2013 entitled "Low-Latency Touch Sensitive Device," U.S. patent application Ser. No. 14/046,819 filed Oct. 4, 2013 entitled "Hybrid Systems And Methods For Low-Latency User Input Processing And Feedback," U.S. Patent Application No. 61/798,948 filed Mar. 15, 2013 entitled "Fast Multi-Touch Stylus," U.S. Patent Application No. 61/799,035 filed Mar. 15, 2013 entitled "Fast Multi-Touch Sensor With User-Identification Techniques," U.S. Patent Application No. 61/798,828 filed Mar. 15, 2013 entitled "Fast Multi-Touch Noise Reduction," U.S. Patent Application No. 61/798,708 filed Mar. 15, 2013 entitled "Active Optical Stylus," U.S. Patent Application No. 61/710,256 filed Oct. 5, 2012 entitled "Hybrid Systems And Methods For Low-Latency User Input Processing And Feedback," U.S. Patent Application No. 61/845,892 filed Jul. 12, 2013 entitled "Fast Multi-Touch Post Processing," U.S. Patent Application No. 61/845,879 filed Jul. 12, 2013 entitled "Reducing Control Response Latency With Defined Cross-Control Behavior," U.S. Patent Application No. 61/879,245 filed Sep. 18, 2013 entitled "Systems And Methods For Providing Response To User Input Using Information About State Changes And Predicting Future User Input," U.S. Patent Application No. 61/880,887 filed Sep. 21, 2013 entitled "Systems And Methods For Providing Response To User Input Using Information About State Changes And Predicting Future User Input," U.S. patent application Ser. No. 14/069,609 filed Nov. 1, 2013 entitled "Fast Multi-Touch Post Processing," U.S. Patent Application No. 61/887,615 filed Oct. 7, 2013 entitled "Touch And Stylus Latency Testing Apparatus," U.S. Patent Application No. 61/928,069 filed Jan. 16, 2014 entitled "Fast Multi-Touch Update Rate Throttling," U.S. Patent Application No. 61/930,159 filed Jan. 22, 2014 entitled "Dynamic Assignment Of Possible Channels In A Touch Sensor," and U.S. Patent Application No. 61/932,047 filed Jan. 27, 2014 entitled "Decimation Strategies For Input Event Processing." The entire disclosures of those applications are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of user input, and in particular to user input systems which deliver a low-latency user experience.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Figure 1:
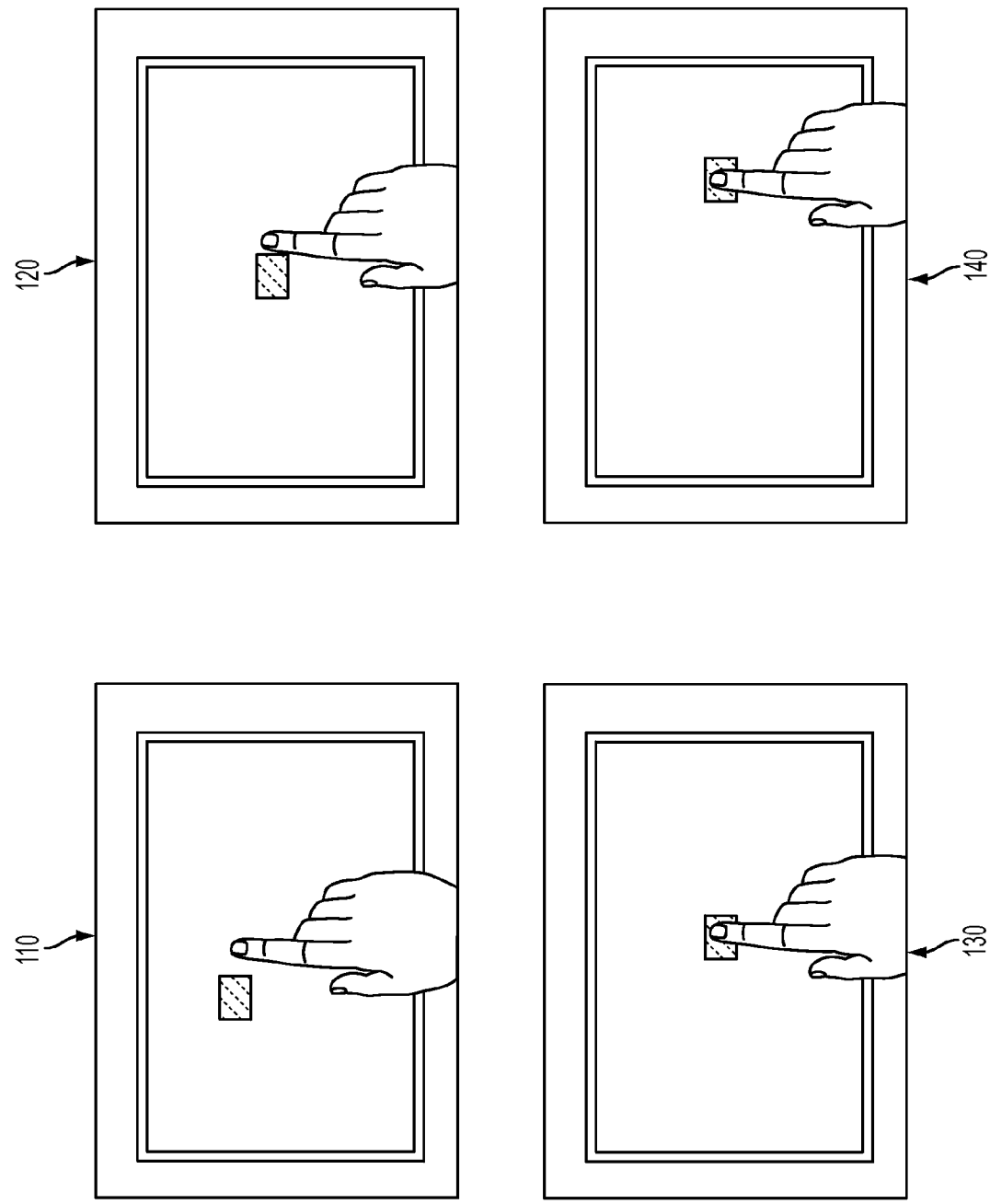
FIG. 1 illustrates a demonstration of the effect of drag latency at 100 ms, 50 ms, 10 ms, and 1 ms in a touch user interface.

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

This application relates to user interfaces such as the fast multi-touch sensors and other interfaces disclosed in U.S. patent application Ser. No. 13/841,436 filed Mar. 15, 2013 entitled "Low-Latency Touch Sensitive Device," U.S. Patent Application No. 61/798,948 filed Mar. 15, 2013 entitled "Fast Multi-Touch Stylus," U.S. Patent Application No. 61/799,035 filed Mar. 15, 2013 entitled "Fast Multi-Touch Sensor With User-Identification Techniques," U.S. Patent Application No. 61/798,828 filed Mar. 15, 2013 entitled "Fast Multi-Touch Noise Reduction," U.S. Patent Application No. 61/798,708 filed Mar. 15, 2013 entitled "Active Optical Stylus," U.S. Patent Application No. 61/710,256 filed Oct. 5, 2012 entitled "Hybrid Systems And Methods For Low-Latency User Input Processing And Feedback," U.S. Patent Application No. 61/845,892 filed Jul. 12, 2013 entitled "Fast Multi-Touch Post Processing," U.S. Patent Application No. 61/845,879 filed Jul. 12, 2013 entitled "Reducing Control Response Latency With Defined Cross-Control Behavior," and U.S. Patent Application No. 61/879,245 filed Sep. 18, 2013 entitled "Systems And Methods For Providing Response To User Input Using Information About State Changes And Predicting Future User Input." The entire disclosures of those applications are incorporated herein by reference.

In various embodiments, the present disclosure is directed to systems and methods that provide direct manipulation user interfaces with low latency. Direct physical manipulation of pseudo "real world" objects is a common user interface metaphor employed for many types of input devices, such as those enabling direct-touch input, stylus input, in-air gesture input, as well as indirect devices, including mice, trackpads, pen tablets, etc. For the purposes of the present disclosure, latency in a user interface refers to the time it takes for the user to be presented with a response to a physical input action. Tests have shown that users prefer low latencies and that users can reliably perceive latency as low as 5-10 ms, as will be discussed in greater detail below.

Figure 11:
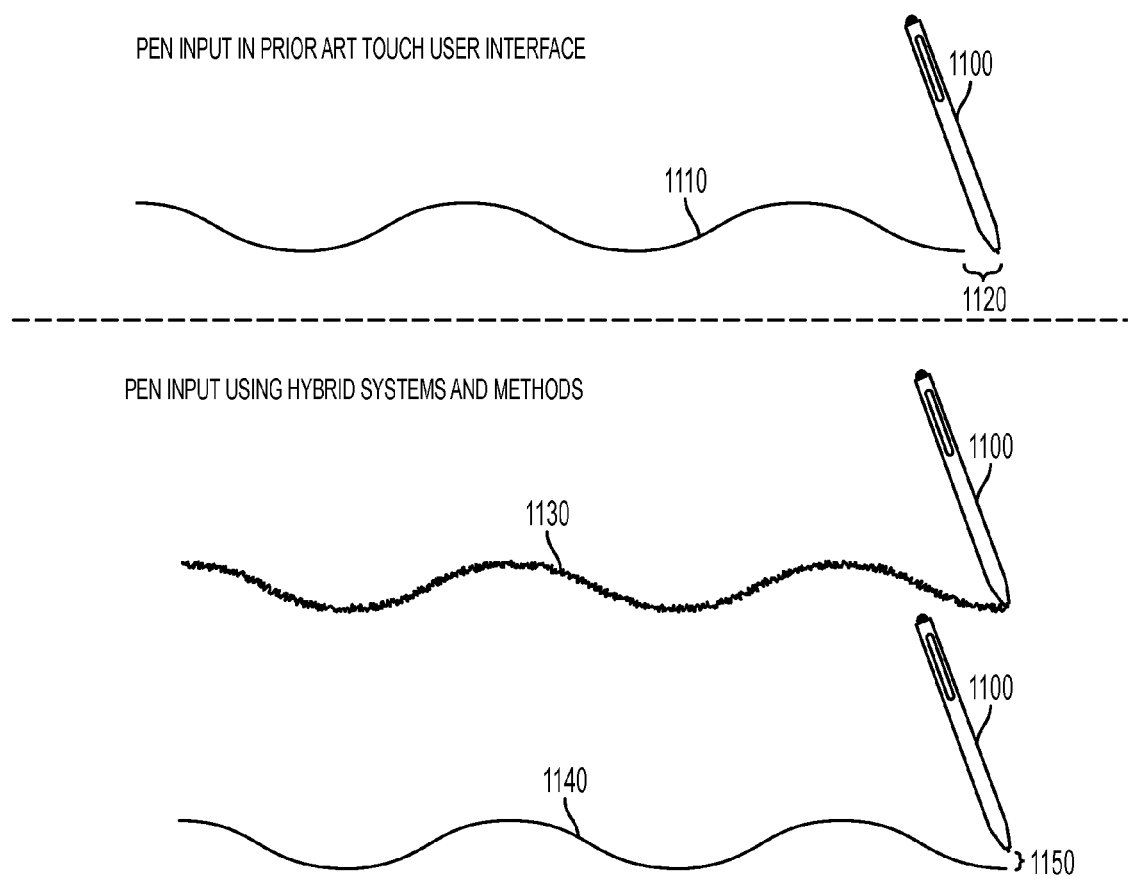
FIG. 11 shows the system's response for pen input in prior art systems compared to an embodiment of the UI for pen input in the present hybrid feedback user interface system. In the hybrid system, the ink stroke has a low-latency response to pen input, as well as a high-latency response to a pen user input.

FIG. 1 illustrates a demonstration of the effect of latency in an exemplary touch user interface at 100 ms (ref. no. 110), 50 ms (ref. no. 120), 10 ms (ref. no. 130), and 1 ms (ref. no. 140) respectively. When dragging an object, increasing latency is reflected as an increasing distance between the user's finger and the object being dragged (in this case a square user interface element). As can be seen, the effects of latency are pronounced at 100 ms (ref no. 110) and 50 ms (ref. no. 120), but become progressively less significant at 10 ms (ref no. 130), and virtually vanish at 1 ms (ref. no. 140). FIG. 11 illustrates the effects of latency in an exemplary stylus or pen user interface (1110, 1120). In this example, lag 1120 is visible as an increasing distance between the stylus 1100 tip and the computed stroke 1110. With the introduction of low-latency systems, the distance between the stylus 1100 tip and the computed stroke 1130 would be significantly reduced.

In an embodiment, the presently disclosed systems and methods provide a hybrid touch user interface that provides immediate visual feedback with a latency of less than 10 ms, inter-woven or overlayed with additional visual responses at higher levels of latency. In some embodiments, the designs of these two sets of responses may be designed to be visually unified, so that the user is unable to distinguish them. In some embodiments, the "low latency" response may exceed 10 ms in latency.

Causes of Latency

In various embodiments, latency in a user input device and the system processing its input can have many sources, including:
(1) the physical sensor that captures touch events;
(2) the software that processes touch events and generates output for the display;
(3) the display itself;
(4) Data transmission between components, including bus;
(5) Data internal storage in either memory stores or short buffers;
(6) Interrupts and competition for system resources;
(7) Other sources of circuitry can introduce latency;
(8) Physical restrictions, such as the speed of light, and its repercussions in circuitry architecture.
(9) Mechanical restrictions, such as the time required for a resistive touch sensor to bend back to its 'neutral' state.

In various embodiments, reducing system latency can be addressed through improving latency in one or more of these components. In an embodiment, the presently disclosed systems and methods provide an input device that may achieve 1 ms of latency or less by combining a low-latency input sensor and display with a dedicated processing system. In an embodiment, the presently disclosed systems and methods provide an input device that may achieve 5 ms of latency or less by combining such low-latency input sensor and display with a dedicated processing system. In a further embodiment, the presently disclosed systems and methods provide an input device that may achieve 0.1 ms of latency or less by combining such low-latency input sensor and display with a dedicated processing system. In a further embodiment, the presently disclosed systems and methods provide an input device that may achieve 10 ms of latency or less by combining such low-latency input sensor and display with a dedicated processing system. In an embodiment, in order to achieve such extremely low latencies, the presently disclosed systems and methods may replace conventional operating system (OS) software and computing hardware with a dedicated, custom-programmed field programmable gate array (FPGA) or application-specific integrated circuit (ASIC). In an embodiment, the FPGA or ASIC replaces the conventional OS and computing hardware to provide a low latency response, while leaving a traditional OS and computing hardware in place to provide a higher latency response (which is used in addition in addition to the low latency response). In another embodiment, some or all of the function of the FPGA or ASIC described may be replaced by integrating additional logic into existing components such as but not limited to the graphics processing unit (GPU), input device controller, central processing unit (CPU), or system on a chip (SoC). The low-latency logic can be encoded in hardware, or in software stored-in and/or executed by those or other components. In embodiments where multiple components are required, communication and/or synchronization may be facilitated by the use of shared memory. In any of these embodiments, responses provided at high or low latency may be blended together, or only one or the other might be provided in response to any given input event.

Figure 2:
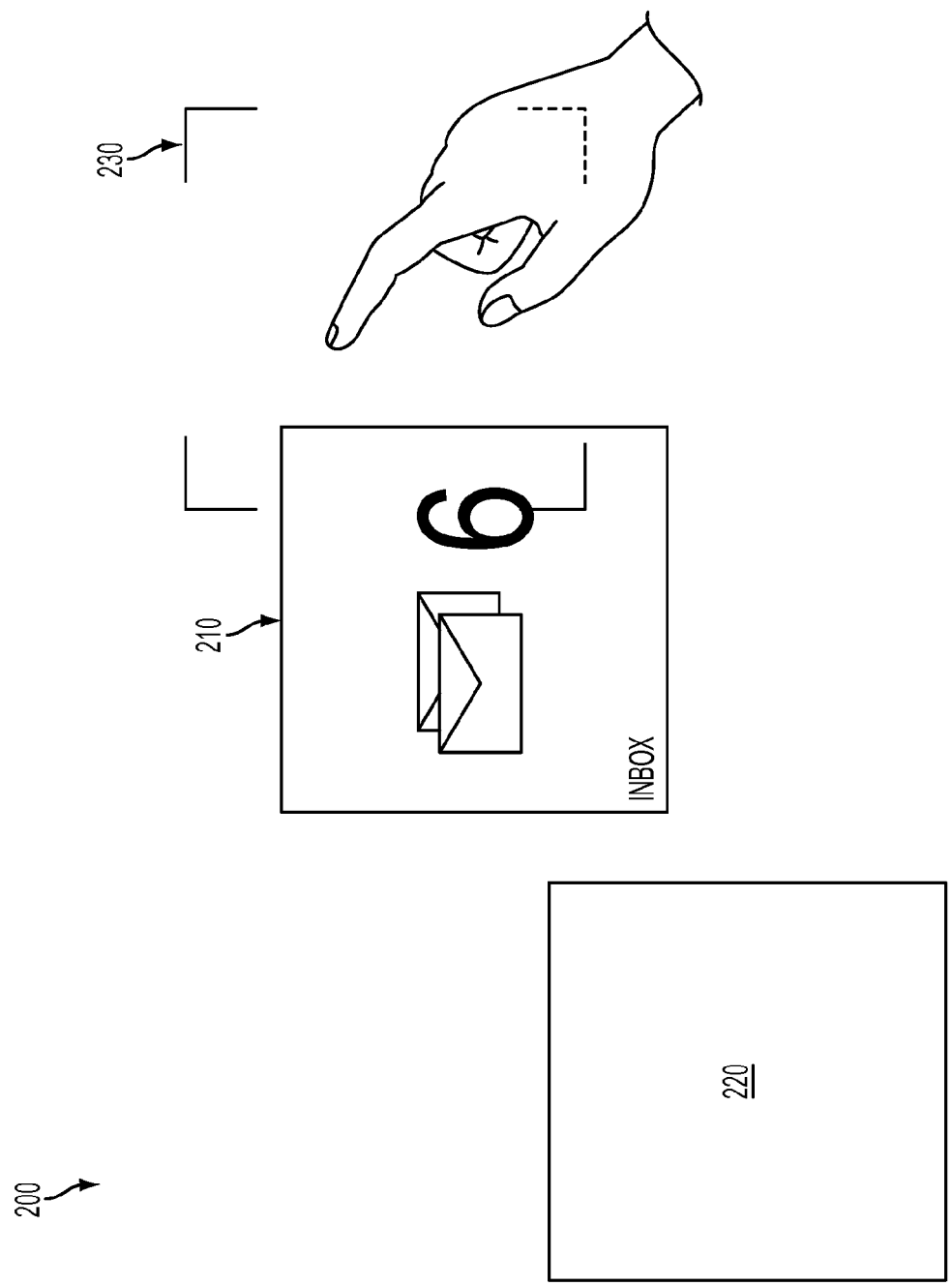
FIG. 2 shows an example of a user interface element for an inbox, where the element has a low latency, low fidelity response to a touch user interaction, as well as a high-latency, high-fidelity response a touch user interaction.

In various embodiments, the disclosed systems and methods provide what is referred to herein as "hybrid feedback." In a hybrid feedback system, some of the basic system responses to input are logically separated from the broader application logic. The result provides a system with a nimble input processor, capable of providing nearly immediate system feedback to user input events, with more feedback based on application logic provided at traditional levels of latency. In some embodiments, these system responses are provided visually. In various embodiments, the low-latency component of a hybrid feedback system may be provided through audio or vibro-tactile feedback. In some embodiments, the nearly immediate feedback might be provided in the same modality as the application-logic feedback. In some embodiments, low-latency feedback may be provided in different modalities, or multiple modalities. An example of an all-visual embodiment is shown in FIG. 2, in this case showing the use of a touch input device. In particular, FIG. 2 shows the result after a user has touched and then dragged an icon 210 representing an inbox. When the user touches the icon 210, a border 220 or other suitable primitive may be displayed. In an embodiment, in an all-visual low-latency feedback, a suitable low-fidelity representation may be selected due to its ease of rendering. In an embodiment, a low-latency feedback may be provided using one or more primitives that can provide a suitable low-fidelity representation. In an embodiment, if the user drags the icon to another place on the touch display 200, a low fidelity border 230 is displayed and may be manipulated (e.g., moved) with a low latency of, for example, 1 ms. Simultaneously, the movement of the icon 210 may be shown with higher latency. In an embodiment, the difference in response between the nearly immediate low-latency response and the likely slower application-logic feedback can be perceived by a user. In another embodiment, this difference in response between the low-latency response and a traditional response is blended and less noticeable or not noticeable to a user. In an embodiment, the nearly immediate feedback may be provided at a lower fidelity than the traditional-path application-logic feedback. In an embodiment, in at least some cases, the low latency response may be provided at similar or even higher fidelity than the application-logic feedback. In an embodiment, the form of low-latency nearly immediate feedback is dictated by application logic, or logic present in the system software (such as the user interface toolkit). For example, in an embodiment, application logic may pre-render a variety of graphical primitives that can then be used by a low-latency subsystem. Similarly, in an embodiment, a software toolkit may provide the means to develop graphical primitives that can be rendered in advance of being needed by the low latency system. In an embodiment, low-latency responses may be predetermined, or otherwise determined without regard to application and/or system software logic. In an embodiment, individual pre-rendered or partially rendered low-latency responses, or packages of pre-rendered or partially rendered low-latency responses can be pre-loaded into a memory so as to be accessible to the low-latency subsystem in advance of being needed for use in response to a user input event.

In an embodiment, the modality of low-latency output might be auditory. In an embodiment, the low-latency system may be used, for example, to send microphone input quickly to the audio output system, which may provide users with an "echo" of their own voice being spoken into the system. Such a low-latency output may provide the impression of having the same type of echo characteristics as traditional analog telephones, which allow a user to hear their own voice. In an embodiment, low-latency auditory feedback might be provided in response to user input events (e.g., touch, gesture, pen input, oe oral inputs), with a higher latency response provided visually.

Figure 3:
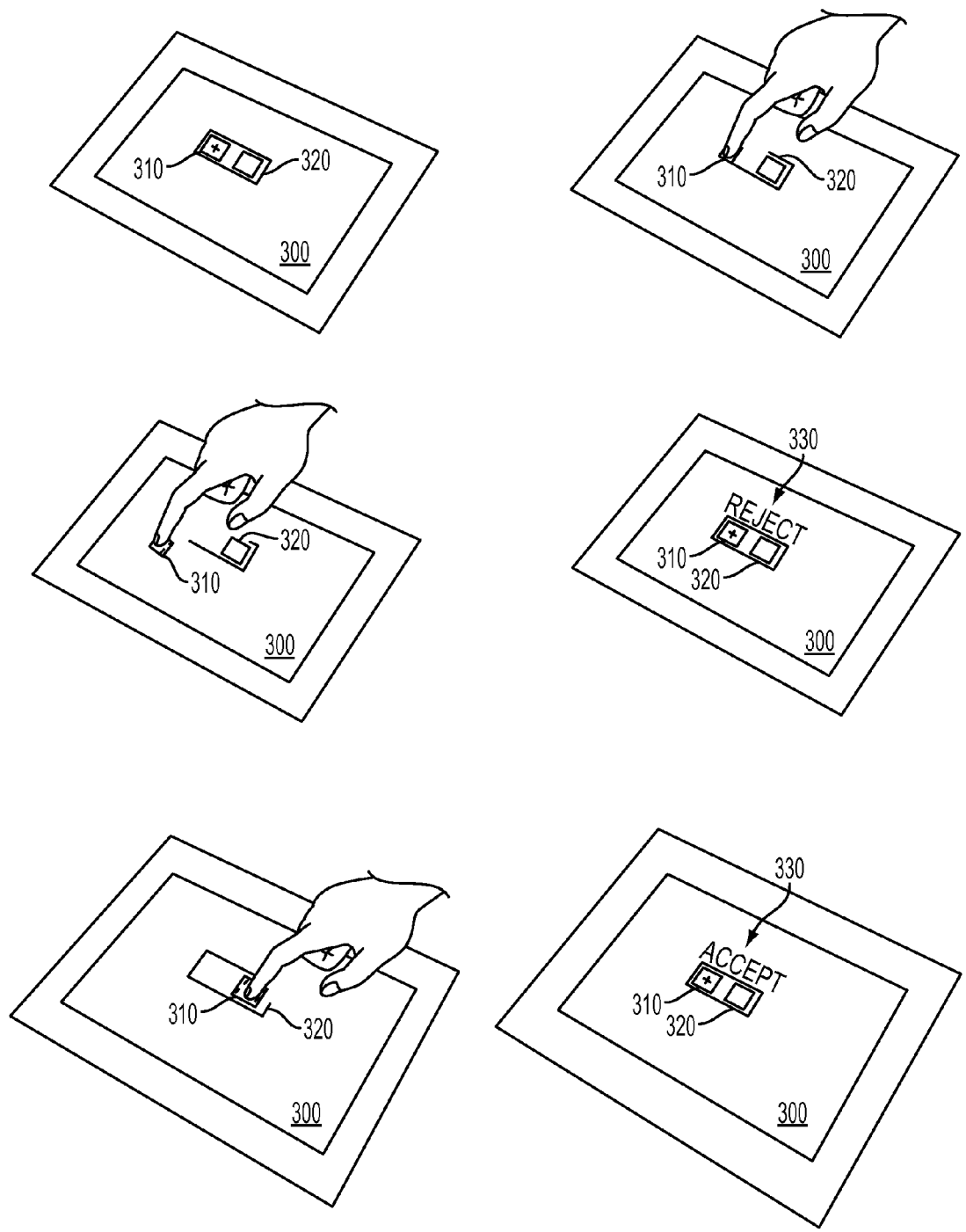
FIG. 3 shows an example of a user interface of a sliding toggle element. A cursor 310 (represented by the box containing a "cross" character) can be dragged to the target 320 (second empty box, on the right) to activate the UI Element. This element is enabled using both the low latency and high-latency system to provide a touch interaction where moving elements are accelerated 310, thus providing a low-latency experience.

Another illustrative embodiment of a system that employs the present method and system is shown in FIG. 3. In the illustrative system, a cursor 310 (represented by the box containing a "cross" character) can be dragged anywhere on a device's screen 300. When cursor 310 is dragged to target box 320, the UI action is accepted. If the cursor 310 is dragged elsewhere on the screen 300, the action is rejected. In an embodiment, when dragged, the cursor 310 is drawn with low latency, and thus tracks the user's finger without perceptible latency. In an embodiment, the target 320 can be drawn with higher latency without impacting user perception. Similarly, in an embodiment, the response 330 of "REJECT" or "ACCEPT" may occur perceptibly later, and thus it can be drawn at a higher latency, e.g., not using the low latency subsystem, without impacting user perception.

It should be understood that the illustrated embodiment is exemplary. The principles illustrated in FIG. 3 may be applied to any kind of UI element, including all UI elements that are now known, or later developed in the art. Similarly, the principals illustrated in FIG. 3 can be used with substantially any kind of input event on various types of input devices and/or output devices. For example, in an embodiment, in addition to a "touch" event as illustrated above, input events can include, without limitation, in-air or on-surface gestures, speech, voluntary (or involuntary eye movement, and pen. In an embodiment, once a gesture takes place, the response of any UI element may be bifurcated, where a low-latency response (e.g., a low-fidelity representation of a UI element is presented and responds quickly, for example, in 0.01 ms.), and a non-low-latency response (e.g., a further refined representation of the UI element) is provided with latency commonly exhibited by a system that does not provide accelerated input. In an embodiment, responses may not be split in a hybrid system, and may instead be entirely low latency, with application logic not responsible for the low-latency response otherwise executing with higher latency.

In an embodiment, touch and/or gesture input events can be achieved using a variety of technologies, including, without limitation, resistive, direct illumination, frustrated total-internal reflection, diffuse illumination, projected capacitive, capacitive coupling, acoustic wave, and sensor-in-pixel. In an embodiment, pen input can be enabled using resistive, visual, capacitive, magnetic, infrared, optical imaging, dispersive signal, acoustic pulse, or other techniques. In an embodiment, gestural input may also be enabled using visual sensors or handheld objects (including those containing sensors, and those used simply for tracking), or without handheld objects, such as with 2D and 3D sensors. Combinations of the sensors or techniques for identifying input events are also contemplated, as are combinations of event types (i.e., touch, pen, gesture, retna movement, etc.) One property technologies to identify or capture input events share is that they contribute to the latency between user action and the system's response to that action. The scale of this contribution varies across technologies and implementations.

In a typical multitouch system, there is a path of information flow between the input device and the display that may involve communications, the operating system, UI toolkits, the application layer, and/or ultimately, the audio or graphics controller. Each of these can add latency. Moreover, latency introduced by an operating system, especially a non-real time operating system, is variable. Windows, iOS, OSX, Android, etc. are not real time operating systems, and thus, using these operating systems, there is no guarantee that a response will happen within a certain time period. If the processor is heavily loaded, for example, latency may increase dramatically. Further, some operations are handled at a very low level in the software stack and have high priority. For example, the mouse pointer is typically highly optimized so that even when the processor is under heavy load, the perceived latency is relatively low. In contrast, an operation such as resizing a photo with two fingers on a touch or gestural system is generally much more computationally intensive as it may require constant rescaling of the image at the application and/or UI toolkit levels. As a result, such operations are rarely able to have a low perceived latency when the processor is under heavy load.

In a typical multitouch system, the display system (including the graphics system as well as the display itself) may also contribute to latency. Systems with high frame rates may obscure the actual latency through the system. For example, a 60 Hz monitor may include one or more frames of buffer in order to allow for sophisticated image processing effects. Similarly some display devices, such as projectors, include double-buffering in the electronics, effectively doubling the display latency. The desire for 3D televisions and reduced motion artifacts is driving the development of faster LCDs, however, the physics of the liquid crystals themselves make performance of traditional LCD's beyond 480 Hz unlikely. In an embodiment, the low latency system described herein may use an LCD display. In contrast to the performance of an LCD display, OLED or AMOLED displays are capable of response times well below 1 ms. Accordingly, in an embodiment, the high performance touch (or gesture) system described herein may be implemented on displays having fast response times, including, without limitation displays based on one or more of the following technologies: OLED, AMOLED, plasma, electrowetting, color-field-sequential LCD, optically compensated bend-mode (OCB or Pi-Cell) LCD, electronic ink, etc.

Latency Perception Studies

Figure 4:
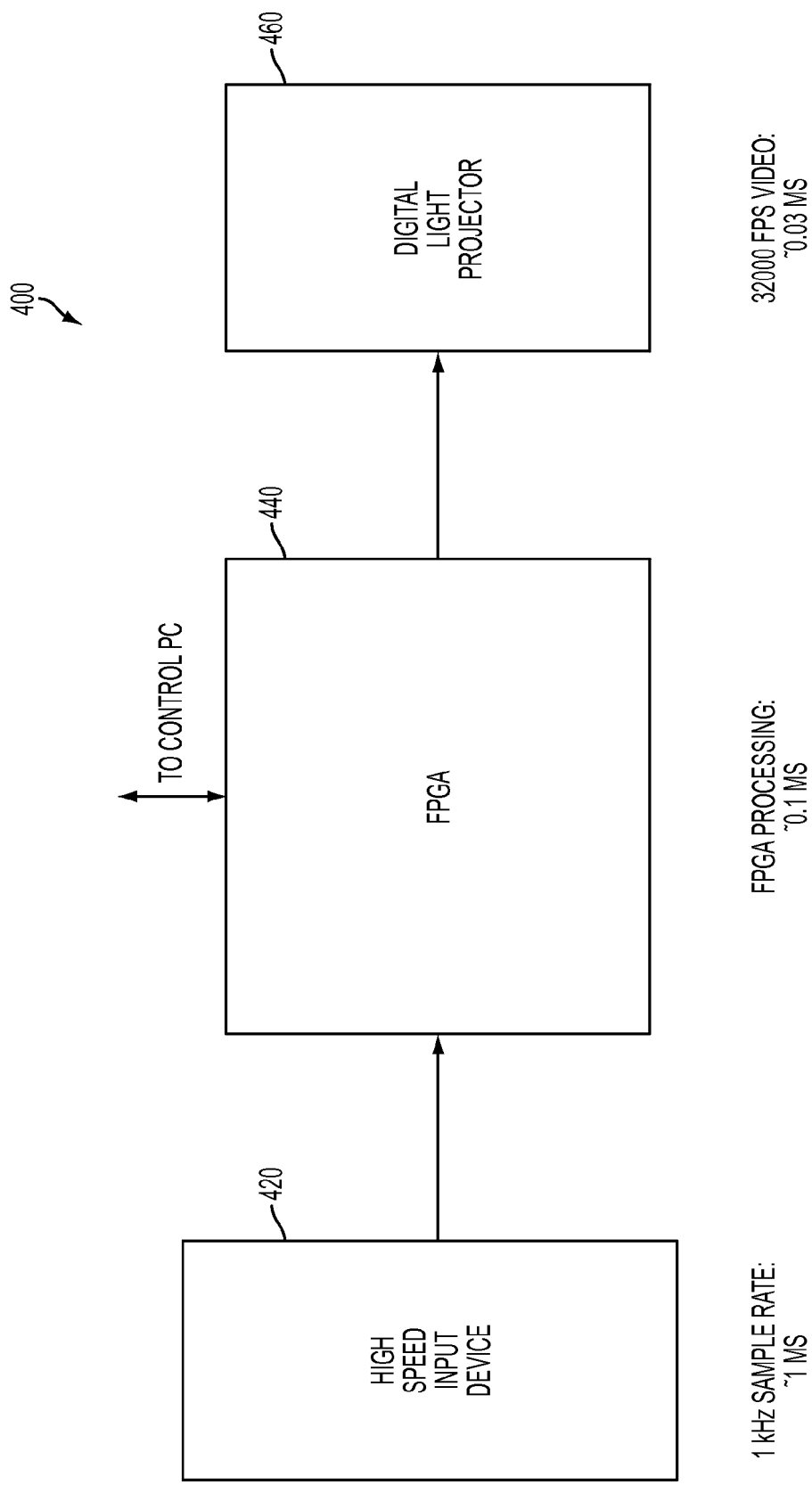
FIG. 4 shows an illustrative embodiment of a basic architecture of a prototype high-performance touch system used in latency perception studies.

Studies were undertaken to determine what latencies in a direct touch interface users perceive as essentially instantaneous. A prototype device represented in a block diagram in FIG. 4 shows an illustrative embodiment of a basic architecture of a prototype high-performance touch system 400. In an embodiment, the high-speed input device 420 is a multi-touch resistive touch sensor having an active area of 24 cm×16 cm, and electronics that allow for very high-speed operation. The delay through this sensor is slightly less than 1 ms. In an embodiment, touch data may be transmitted serially over an optical link.

In the illustrative testing system, the display 460 is a DLP Discovery 4100 kit based on Texas Instruments' Digital Light Processing technology. The illustrative testing system utilizes front-projection onto the touch sensor thus eliminating parallax error that might disturb a user's perception of finger and image alignment. The DLP projector employed uses a Digital Micromirror Device (DMD), a matrix of mirrors which effectively turns pixels on or off at very high speed. The high speed of the mirrors may be used to change the percentage time on vs. off to create the appearance of continuous colored images. In an embodiment, where only simple binary images are used, these can be produced at an even higher rate. In the illustrative testing system, the projector development system displays 32,000 binary frames/second at 1024×768 resolution with latency under 40 μs. In the illustrative testing system to achieve this speed, the video data is streamed to the DMD at 25.6 Gbps.

In the illustrative testing system, to achieve minimal latency, all touch processing is performed on a dedicated FPGA 440—no PC or operating system is employed between the touch input and the display of low latency output. The DLP kit's onboard XC5VLX50 application FPGA may be used for processing the touch data and rendering the video output. A USB serial connection to the FPGA allows parameters to be changed dynamically. In the illustrative testing system, latency can be adjusted from 1 ms to several hundred ms with 1 ms resolution. Different testing modes can be activated, and a port allows touch data to be collected for analysis.

In the illustrative testing system, to receive touch data from the sensor 420, the system communicates through a custom high-speed UART. To minimize latency, a baud rate of 2 Mbps can be used, which represents a high baud rate that can be used without losing signal integrity due to high frequency noise across the communication channel. In the illustrative testing system, the individual bytes of compressed touch data are then processed by a touch detection finite state machine implemented on the FPGA 440. The finite-state machine (FSM) simultaneously decodes the data and performs a center-of-mass blob-detection algorithm to identify the coordinates of the touches. In the illustrative testing system, the system is pipelined such that each iteration of the FSM operates on the last received byte such that no buffering of the touch data occurs.

In the illustrative testing system, the touch coordinates are then sent to a 10-stage variable delay block. Each delay stage is a simple FSM with a counter and takes a control signal that indicates the number of clock cycles to delay the touch coordinate, allowing various levels of latency. The delay block latches the touch sample at the start of the iteration and waits for the appropriate number of cycles before sending the sample and latching the next. The delay block therefore lowers the sample rate by a factor of the delay count. In an embodiment, to keep the sample rate at a reasonable level, 10 delay stages can be used, so that, for example, to achieve 100 ms of latency, the block waits 10 ms between samples for a sample rate of 100 Hz. In the illustrative testing system, to run basic applications, a MicroBlaze soft processor is used to render the display.

In an embodiment, the testing system may use a hard coded control FSM in place of the MicroBlaze for improved performance. In an embodiment another soft processor may be used. In the illustrative testing system, the MicroBlaze is a 32-bit Harvard architecture RISC processor optimized to be synthesized in Xilinx FPGAs. The MicroBlaze soft processor instantiation allows the selection of only the cores, peripherals, and memory structures required. In the illustrative testing system, in addition to the base MicroBlaze configuration, an interrupt controller can be used, for example, GPIOs for the touch data, a GPIO to set the variable latency, a BRAM memory controller for the image buffer, and a UART unit to communicate with a PC. In the illustrative testing system, the MicroBlaze is clocked at 100 MHz. The MicroBlaze uses an interrupt system to detect valid touch coordinates. A touch ready interrupt event is generated when valid touch data arrives on the GPIOs from the delay block, and the corresponding image is written to the image buffer. Because of the non-uniform nature of an interrupt-based system, the exact latency cannot be computed, but, by design, it is insignificant in comparison to the 1 ms latency due to the input device.

In the illustrative testing system, the image buffer is synthesized in on-chip BRAM blocks. These blocks can provide a dual-port high-speed configurable memory buffer with enough bandwidth to support high frame-rate display. In the illustrative testing system, the image buffer is clocked at 200 MHz with a bus width of 128 bits for a total bandwidth of 25.6 Gbps, as needed by the DLP. Finally, the DMD controller continuously reads out frames from the image buffer and generates the signals with appropriate timing to control the DMD.

In the illustrative testing system, user input is sent simultaneously to a traditional PC, and is processed to produce a traditional, higher latency, response. This higher latency response is output by a traditional data projector, aligned to overlap with the projected lower latency response.

Studies were conducted to determine the precise level of performance that users are able to perceive when performing common tasks on a touch screen interface. To that end, studies were conducted to determine the just-noticeable difference (JND) of various performance levels. JND is the measure of the difference between two levels of a stimulus which can be detected by an observer. In this case, the JND is defined as the threshold level at which a participant is able to discriminate between two unequal stimuli—one consistently presented at the same level, termed the reference, and one whose value is changed dynamically throughout the experiment, termed the probe. A commonly accepted value for the JND at some arbitrary reference value is a probe at which a participant can correctly identify the reference 75% of the time. A probe value that cannot be distinguished from the reference with this level of accuracy is considered to be "not noticeably different" from the reference.

Studies were conducted to determine the JND level of the probe latency when compared to a maximum performance of 1 ms of latency, which served as the reference. While such a determination does not provide an absolute value for the maximum perceptible performance, it can serve as our "best case" floor condition against which other levels of latency can be measured, given that it was the fastest speed our prototype could achieve. It was found participants are able to discern latency values that are significantly lower (<20 ms) which typical current generation hardware (e.g., current tablet and touch computer) provides (~50-200 ms).

Ten right-handed participants (3 female) were recruited from the local community. Ages ranged between 24 and 40 (mean 27.80, standard deviation 4.73). All participants had prior experience with touch screen devices, and all participants owned one or more touch devices (such as an iOS- or Android-based phone or tablet). Participants were repeatedly presented with pairs of latency conditions: the reference value (1 ms) and the probe (between 1 and 65 ms of latency). Participants dragged their finger from left to right, then right to left on the touch screen display. While any dragging task would have been suitable, left/right movements reduce occlusion in high-latency cases. Participants were asked to move in both directions to ensure they did not "race through" the study. Beneath the user's contact point, the system rendered a solid white 2 cm×2 cm square as seen in FIG. 1. The speed of movement was left to be decided by the participants. The order of the conditions was randomized for each pair. The study was designed as a two-alternative forced-choice experiment; participants were instructed to choose, within each trial, which case was the reference (1 ms) value and were not permitted to make a "don't know" or "unsure" selection. After each pair, participants informed the experimenter which of the two was "faster".

In order for each trial to converge at a desired JND level of 75%, the amount of added latency was controlled according to an adaptive staircase algorithm. Each correct identification of the reference value caused a decrease in the amount of latency in the probe, while each incorrect response caused the probe's latency to increase. In order to reach the 75% confidence level, increases and decreases followed the simple weighted up-down method described by Kaernbach (Kaernbach, C. 1991. *Perception & Psychophysics* 49, 227-229), wherein increases had a three-fold multiplier applied to the base step size, and decreases were the base step size (initially 8 ms).

When a participant responded incorrectly after a correct response, or correctly after an incorrect response, this was termed a reversal as it caused the direction of the staircase (increasing or decreasing) to reverse. The step size, initially 8 ms, was halved at each reversal, to a minimum step size of 1 ms. This continued until a total of 10 reversals occurred, resulting in a convergence at 75% correctness. Each participant completed eight staircase "runs." Four of these started at the minimum probe latency (1 ms) and four at the maximum (65 ms). The higher starting value of the staircase was chosen because it roughly coincides with commercial offerings, and because pilot testing made it clear that this value would be differentiated from the 1 ms reference with near 100% accuracy, avoiding ceiling effects. Staircases were run two at a time in interleaved pairs to prevent response biases that would otherwise be caused by the participants' ability to track their progress between successive stimuli. Staircase conditions for each of these pairs were selected at random without replacement from possibilities (2 starting levels×4 repetitions). The entire experiment, including breaks between staircases, was completed by each participant within a single 1-hour session.

Figure 5:
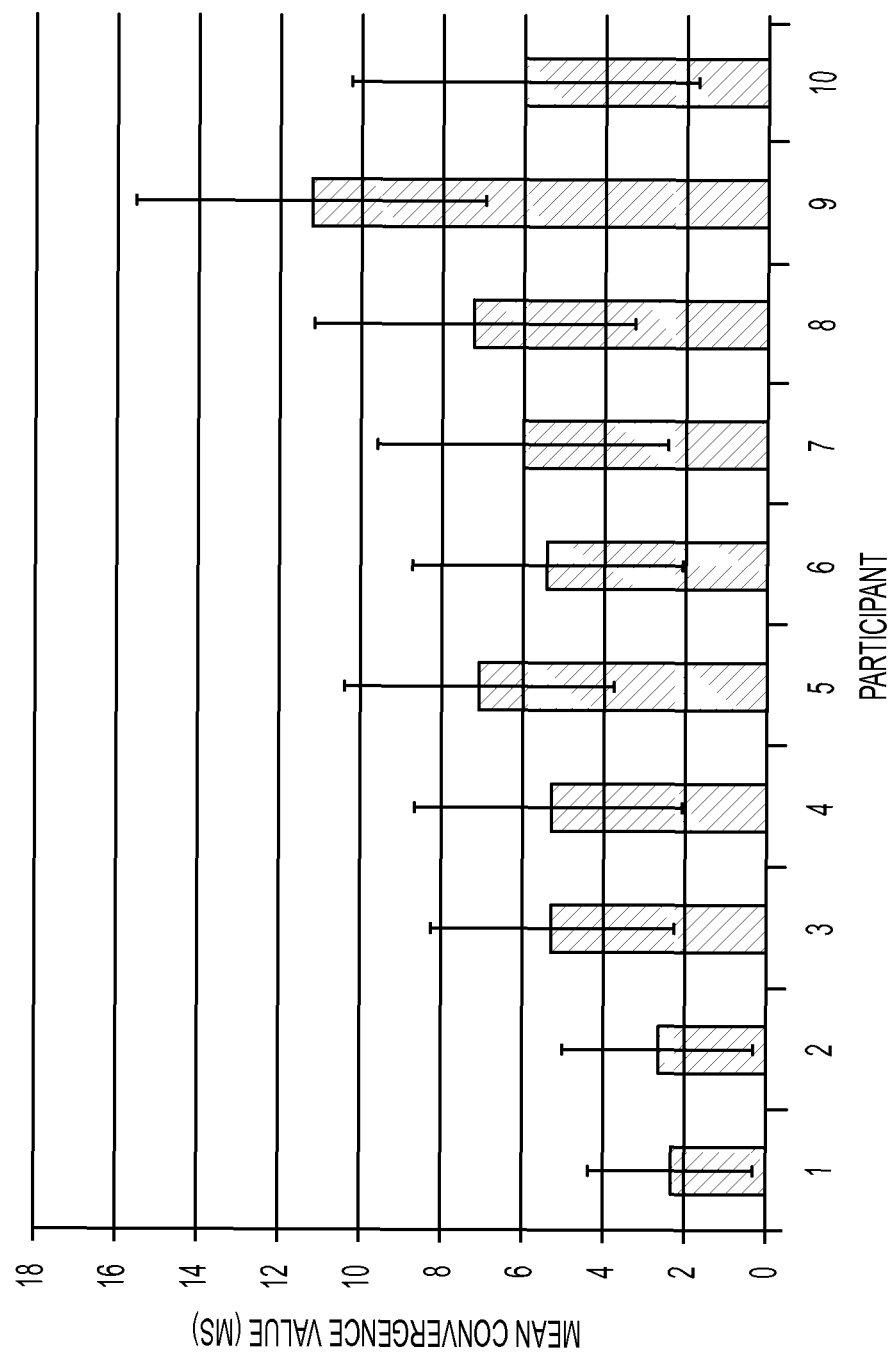
FIG. 5 shows results of latency perception studies using the prototype device of FIG. 4.

The study was designed to find the just-noticeable difference (JND) level for latency values greater than 1 ms. This JND level is commonly agreed to be the level where the participant is able to correctly identify the reference 75% of the time. Participant JND levels ranged from 2.38 ms to 11.36 ms, with a mean JND across all participants of 6.04 ms (standard deviation 4.33 ms). JND levels did not vary significantly across the 8 runs of the staircase for each participant. Results for each participant appear in FIG. 5.

The results show participants were able to discern differences in latency far below the typical threshold of consumer devices (50-200 ms). It is noted that participants were likely often determining latency by estimating the distance between the onscreen object and their finger as it was moved around the touch screen; this is an artifact of input primitives used in UIs (specifically, dragging). Testing a different input primitive (tapping, for example) would exhibit different perceptions of latency. Results confirm that an order-of magnitude improvement in latency would be noticed and appreciated by users of touch devices.

An Architecture for a Low-Latency Direct Touch Input Device

In an embodiment, a software interface may be designed that enables application developers to continue to use toolkit-based application design processes, but enable those toolkits to provide feedback at extremely low latencies, given the presence of a low-latency system. In an embodiment, the systems and methods outlined in the present disclosure may be implemented on the model-view-controller ("MVC") model of UI development, upon which many UI toolkits are based. An MVC permits application logic to be separated from the visual representation of the application. In an embodiment, an MVC may include, a second, overlaid de facto view for the application. In particular, in an embodiment, touch input receives an immediate response from the UI controls, which is based in part on the state of the application at the time the touch is made. The goal is to provide nearly immediate responses that are contextually linked to the underlying application.

Previous work on application independent visual responses to touch are completely separate from even the visual elements of the UI, adding visual complexity. In an embodiment, according to the systems and methods outlined herein, a set of visual responses are more fully integrated into the UI elements themselves so as to reduce visual complexity. Thus, in an embodiment, where the particular visuals shown provide a de facto "mouse pointer" for touch, the goal is to integrate high performance responses into the controls themselves, providing a more unified visualization. None the less, in an embodiment, the systems and methods allow the rendering of context-free responses by the low-latency subsystem, which are later merged with responses from the high-latency subsystem. In an embodiment, visuals need not be presented in the same rendering pipeline as the rest of the system's response. Instead, a system or method which utilizes hybrid feedback as discussed herein may present lower latency responses to user input in addition to the higher latency responses generated by the traditional system.

Thus, in an embodiment, accelerated input interactions are designed such that the traditional direct-touch software runs as it would normally, with high-latency responses, while an additional set of feedback, customized for the UI element, is provided at a lower latency; with a target of user-imperceptible latency. In an embodiment, these two layers are combined by superimposing two or more images.

In an embodiment, two combined images may include one projected image from the low-latency touch device, and a second from a traditional projector connected to a desktop computer running custom touch software, receiving input from the low-latency subsystem.

The two projector solution described above is meant only to serve as one particular embodiment of the more general idea of combining a low latency response and a traditional response. In an embodiment, the visual output from the low and high-latency sub-systems are logically combined in the display buffer or elsewhere in the system before being sent to the display, and thus, displayed. In an embodiment, transparent, overlapping displays present the low and high-latency output to the user. In an embodiment, the pixels of a display are interlaced so that some are controlled by the low latency subsystem, and some are controlled by the high-latency sub-system; through interlacing, these displays may appear to a user to overlap. In an embodiment, frames presented on a display are interlaced such that some frames are controlled by the low latency subsystem and some frames are controlled by the high-latency sub-system; through frame interlacing, the display may appear to a user to contain a combined image. In an embodiment, the low-latency response may be generated predominantly or entirely in hardware. In an embodiment, the low-latency response may be generated from input sensor data received directly from the input sensor. In an embodiment, the low-latency response is displayed by having a high bandwidth link to the display hardware.

In designing a user interface for a low-latency subsystem, one or more of the following constraints may be considered:

Information: any information or processing needed from the high-latency subsystem in order to form the system's response to input will, necessarily, have high latency, unless such information or processing is e.g., pre-rendered or pre-served.

Performance: the time allowed for formation of responses in low latency is necessarily limited. Even with hardware acceleration, the design of responses must be carefully performance-driven to guarantee responses meet the desired low latency.

Fidelity: the fidelity of the rendered low-latency image may be indistinguishable from the higher-latency rendering (indeed, it may be pre-rendered by the high latency system); additional constraints may be placed on fidelity to improve performance, such as, e.g., that visuals are only monochromatic, and/or limited to visual primitives, and/or that the duration or characteristics of audio or haptic responses are limited. Constraints of this type may be introduced by various elements of the system, including acceleration hardware or by the output hardware (such as the display, haptic output device, or speakers).

Non-Interference: in embodiments where responses are hybridized combinations, some of the application's response may be generated in the low-latency layer, and some in the high-latency layer, a consideration may be how the two are blended, e.g., to provide a seamless response to the user's input. In an embodiment, low-latency responses do not interfere with any possible application response, which will necessarily occur later. In an embodiment, interference may occur between a low-latency response and the traditional response, but the interference may be handled through design, or through blending of the responses.

In an embodiment, a design process was conducted to create a set of visual UI controls with differentiated low and high latency visual responses to touch. A metaphor was sought which would enable a seamless transition between the two layers of response. These visualizations included such information as object position and state. The designs were culled based on feasibility using the above-described constraints. The final design of such embodiment was based on a heads-up display (HUD) metaphor, similar to the visualizations used in military aircraft. The HUD was suitable, since traditional HUDs are geometrically simple, and it is relatively easy to implement a geometrically simple display at an authentic fidelity. The HUD represents just one example of two visual layers being combined, though in many HUDs, a computerized display is superimposed on video or the "real world" itself. Accordingly, a HUD is generally designed to be non-interfering.

Figure 6:
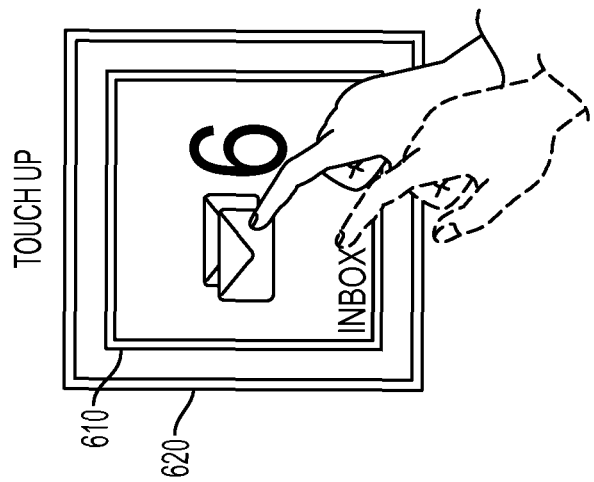
FIG. 6 shows an example of a user interface element for a button, where the element has a low latency, low fidelity response to a touch user interaction, as well as a high-latency, high-fidelity response a touch user interaction.
Figure 6:
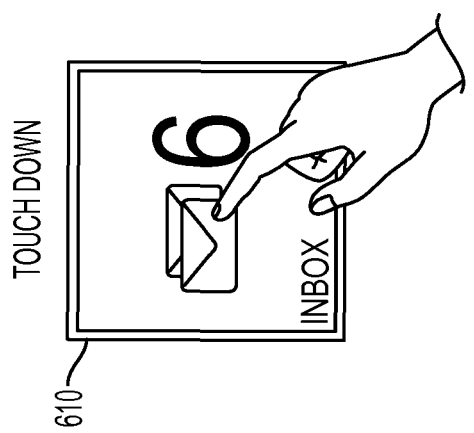
Figure 6:
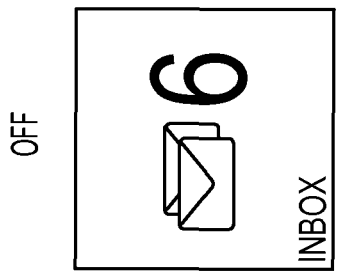
Figure 7:
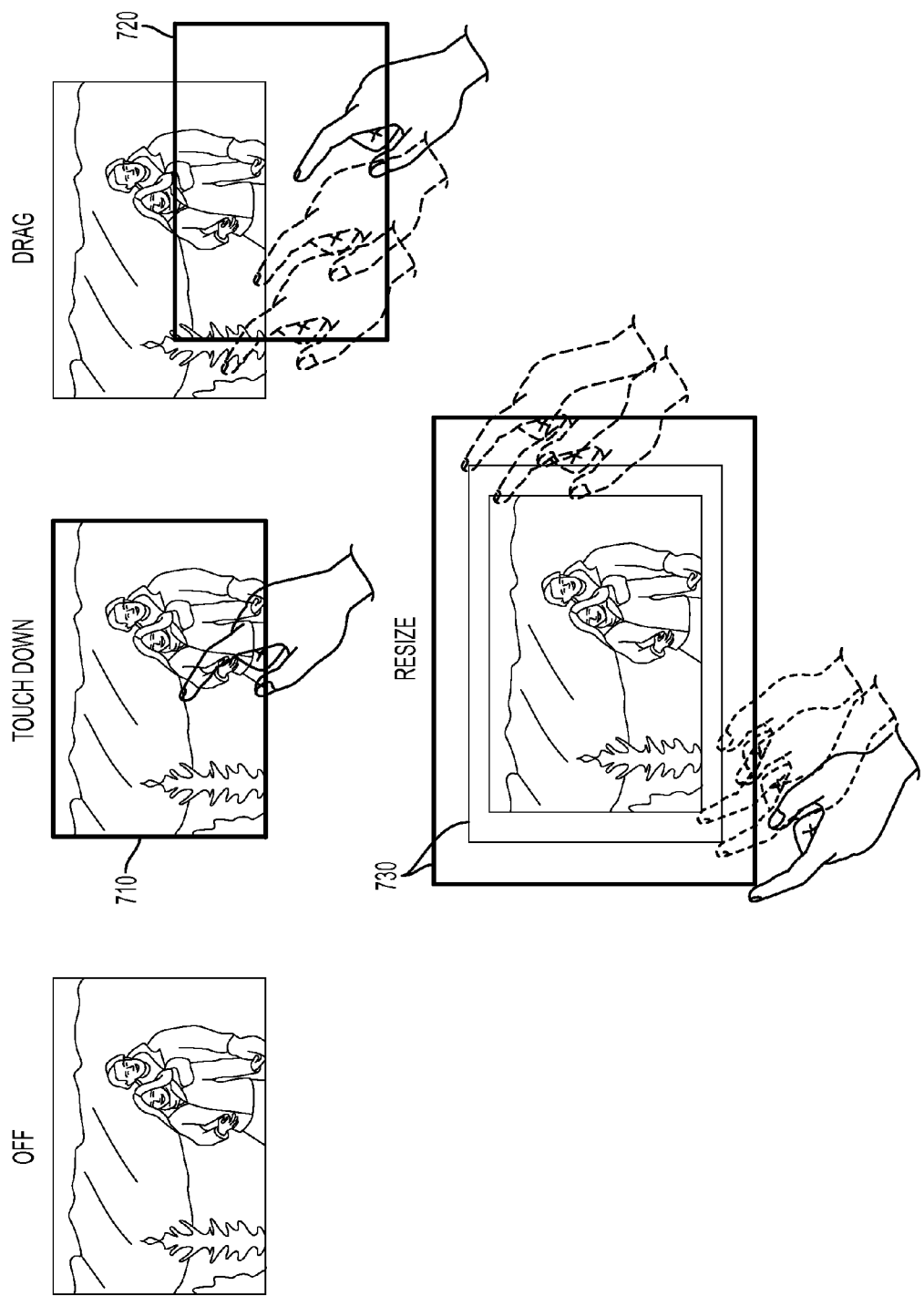
FIG. 7 shows an example of a user interface element for resizable box, where the element has a low latency, low fidelity response to a touch user interaction, as well as a high-latency, high-fidelity response a touch user interaction.
Figure 8:
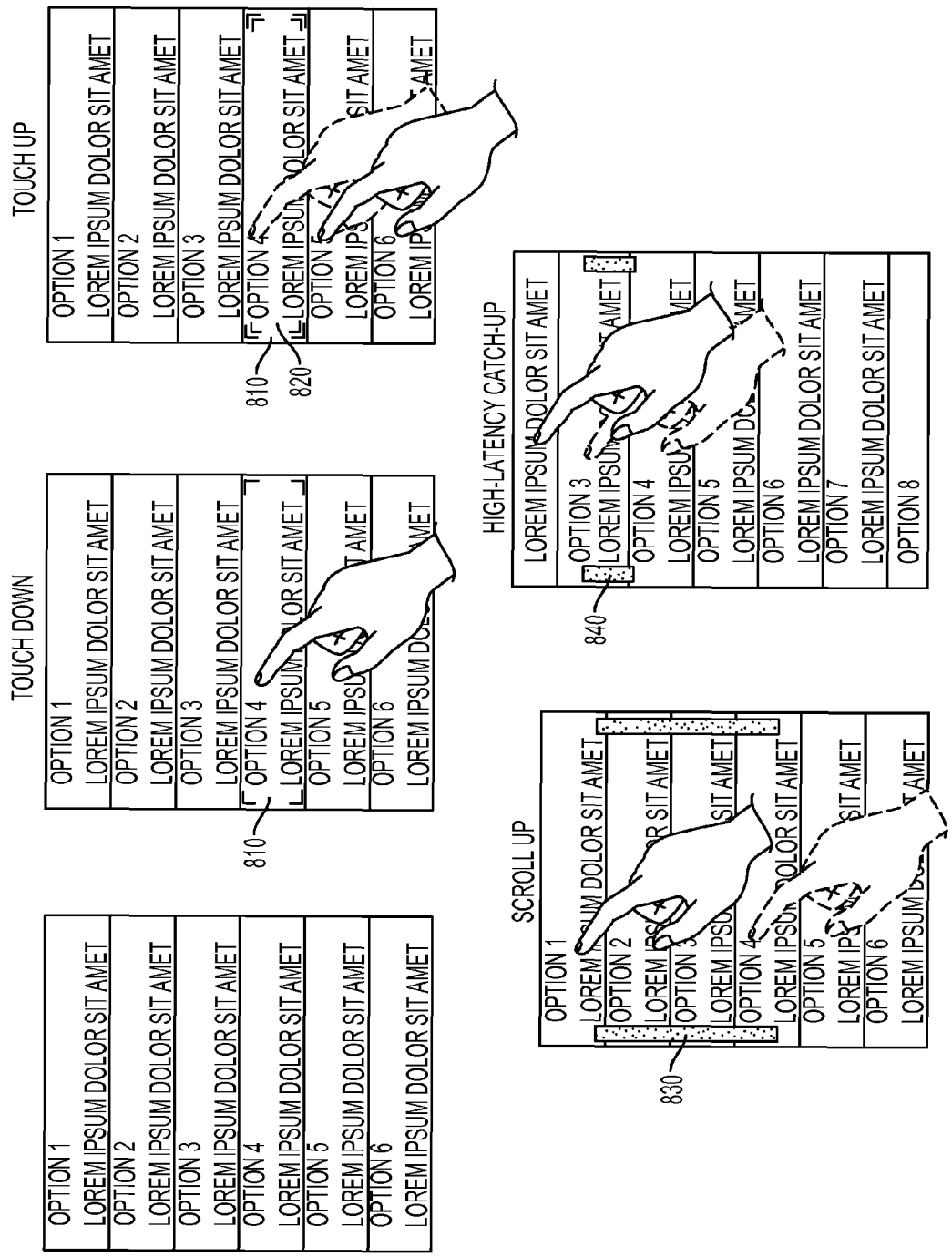
FIG. 8 shows an example of a user interface element for a scrollable list, where the element has a low latency, low fidelity response to a touch user interaction, as well as a high-latency, high-fidelity response to a touch user interaction.

Based on the HUD metaphor, an exemplary set of touch event and UI element-specific low-latency layer visualizations were developed for a set of UI elements found in many direct-touch systems. These exemplary elements are both common and representative; their interactions (taps, drags, two-finger pinching) cover the majority of the interaction space used in current direct-touch devices. The low-latency responses developed in such an embodiment are described in Table 1, and they are shown in FIG. 6-8.

software toolkit 930. UI events are then processed in parallel by two subsystems, a low-latency, low fidelity subsystem 940, and a high-latency subsystem 950 such as, for example, conventional software running in a conventional software stack. In an embodiment, the low-latency, low fidelity subsystem 940 may be implemented in hardware, such as the FPGA 440 of FIG. 4.

The bifurcation described in this embodiment creates a fundamental communication problem where any parameterization of the initial responses provided by the low-latency subsystem 940 required by application logic must be defined before the user begins to give input. Any response which requires processing at the time of presentation by the application will introduce a dependency of the low-latency system 940 upon the high-latency system 950, and may therefore introduce lag back into the system. In an embodiment, later stages of the low-latency system's 940 response to input may depend on the high latency subsystem 950. In an embodiment, dependency of the later stages of a low-latency subsystem's 940 response to input on the high latency subsystem 950 is managed such that the dependency does not introduce additional latency. In an embodiment the dependency would be avoided entirely.

TABLE 1

Accelerated visuals for each element and touch event, which compliment standard high latency responses to touch input.

| Element | Touch Down | Touch Move | Touch Up |
|---|---|---|---|
| Button (FIG. 6) | Bounds outlined 610 | (none) | If within bounds, $2^{nd}$ outline 620, else none |
| Draggable/Resizable (FIG. 7) | Bounds outlined 710 | Outline changes and moves with input position 720 and/or scales with input gesture 730 | Outline 710 fades when high-latency layer catches up |
| Scrollable List (FIG. 8) | List item outlined 810 | If scroll gesture, list edges highlight 830 to scroll distance. If during scroll gesture, edge highlights 840) fade as high-latency layer catches up | If list item selection, outline 820 scales down and fades |

These three elements represent broad coverage of standard UI toolkits for touch input. Most higher-order UI elements are composed of these simpler elements (e.g. radio buttons and checkboxes are both "buttons," a scrollbar is a "draggable/resizable" with constrained translation and rotation). The accelerated input system and method described herein depends on the marriage of visuals operating at two notably different latency levels; this latency difference has been incorporated into the design of low-latency visualizations. In an embodiment, users may be informed of the state of both systems, with a coherent synchronization as the visual layers come into alignment. In an embodiment, a user may be able to distinguish between the high and low latency portions of system feedback. In an embodiment, the visual elements are blended in a manner that provides no apparent distinction between the low-latency response and the traditional response.

Figure 9:
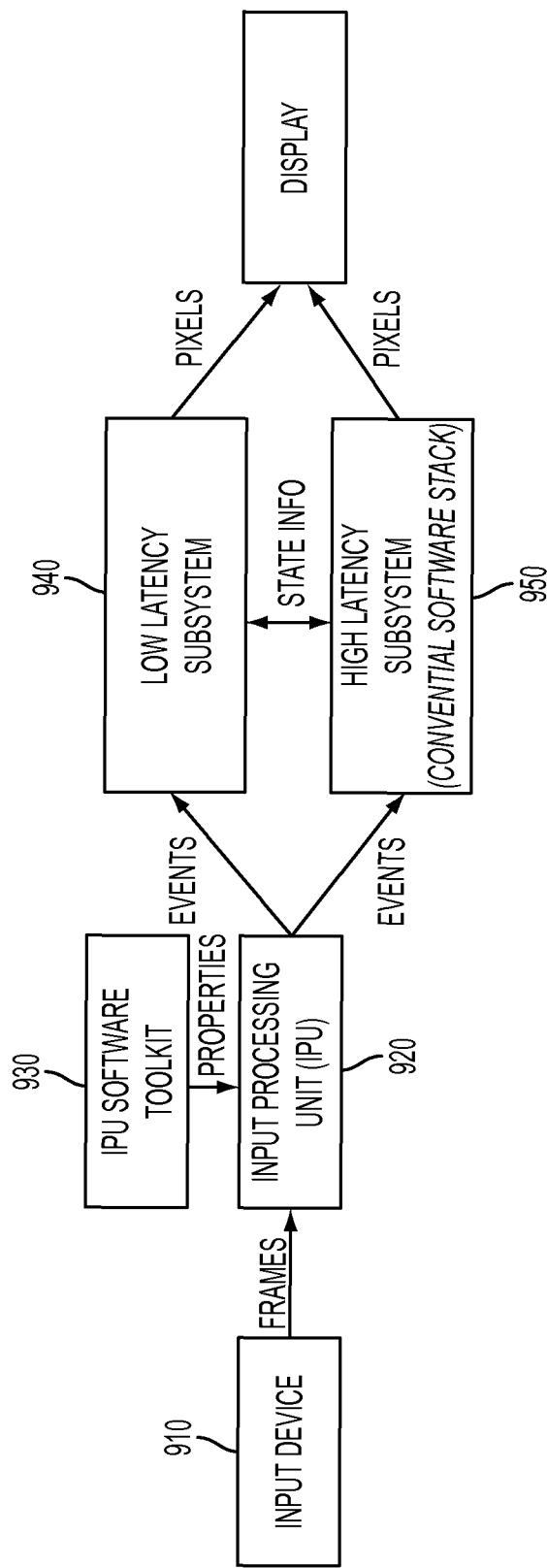
FIG. 9 shows an illustrative embodiment of a basic architecture and information flow for a low-latency input device.

In an embodiment, an application developer utilizes a toolkit to build their application through the normal process of assembling GUI controls. Upon execution, the UI elements bifurcate their visualizations, with high- and low-latency visualizations rendered and overlaid on a single display. An embodiment of information flow through such a system is as shown in FIG. 9. Information flows into the system from an input device 910 and is initially processed by an input processing unit (IPU) 920, programmed via an IPU In an embodiment, UI element logic may be built into the low-latency subsystem. Between user inputs, the application executing in the high-latency subsystem 950, has the opportunity to provide parameters for the low-latency subsystem's 940 model of the UI elements. Thus, in an embodiment, the MVC model of UI software design may be extended by providing a separate controller responsible for low-latency feedback. In an embodiment, in the software design, one or more of the following can be specified for each control:
  Element type (e.g., button, draggable object, scrollable list, etc.).
  Bounding dimensions (e.g., x position, y position, width, height, etc.).
  Conditional: additional primitive information (e.g., size of list items in the case of a scrollable list, etc.).

In an embodiment, logic for a given element-type's response to touch input is stored in the low-latency subsystem 940. Further parameterization of the low-latency subsystem's responses to user input could be communicated in the same manner, allowing a greater degree of customization. In an embodiment, sensor data is processed to generate events (or other processed forms of the input stream), which are then separately distributed to the low-latency subsystem 940 and to the high-latency subsystem 950. Events may be generated at different rates for the low-latency subsystem 940 and high-latency subsystem 950, because the low-latency subsystem is capable of processing events faster than the high-latency subsystem, and sending events to the high-latency sub-system at a high rate may overwhelm that subsystem. The low- and high-latency subsystems' response to user input is therefore independent but coordinated. In an embodiment, one subsystem acts as the "master," setting state of the other subsystem between user inputs. In an embodiment, the relationship between the low- and high-latency subsystems includes synchronization between the two subsystems. In an embodiment, the relationship between the low- and high-latency subsystems includes the ability of the high-latency subsystem to offload processing to the low-latency subsystem 940. In an embodiment, the relationship between the low- and high-latency subsystems includes the ability of the low-latency subsystem 940 to reduce its processing Load and/or utilize the high-latency subsystem 950 for pre-processing or pre-rendering. In an embodiment, a second graphical processing and output system's response is dependent upon a first graphical processing and output system, and state information is passed from the first graphical processing and output system to the second graphical processing and output system. In such embodiments, information passed from the first graphical processing and output system to the second graphical processing and output system is comprised of one or more pieces of data describing one or more of the graphical elements in the user interface. This data may be, e.g., the size, the location, the appearance, alternative appearances, response to user input, and the type of graphical elements in the user interface. The data passed from the first graphical processing and output system to the second graphical processing and output system may be stored in high-speed memory available to the second graphical processing and output system. The passed data may describe the appearance and/or behavior of a button, a slider, a draggable and/or resizable GUI element, a scrollable list, a spinner, a drop-down list, a menu, a toolbar, a combo box, a movable icon, a fixed icon, a tree view, a grid view, a scroll bar, a scrollable window, or a user interface element.

In an embodiment, an input processing system performs decimation on the user input signals before they are received by one or both of the first or second graphical processing and output systems. The decimated input signals or non-decimated signals are chosen from the set of all input signals based on information about the user interface sent from the first graphical processing and output system. The decimation of input signals may be performed by logically combining the set of input signals into a smaller set of input signals. Logical combination of input signals may be performed through windowed averaging. The decimation considers the time of the user input signals when reducing the size of the set of input signals. The logical combination of input signals can be performed through weighted averaging. In an embodiment, the user input signals received by the first and second graphical processing and output systems have been differentially processed.

In an embodiment, communication between the high-latency and low-latency layers may be important. Some points which are considered in determining how the high- and low-latency subsystems remain synchronized are described below:

Latency differences: Low-latency responses may use information about the latency difference between the high- and low-latency layers in order to synchronize responses. In an embodiment, these latency values are static, and thus preprogrammed into the FPGA. In an embodiment where latency levels may vary in either subsystem, it may be advantageous to fix the latency level at an always-achievable constant rather than having a dynamic value that may become unsynchronized, or provide an explicit synchronization mechanism. In an embodiment where latency levels may vary in either subsystem, a dynamic value may be used, however, care should be taken to avoid becoming unsynchronized. In an embodiment where latency levels may vary in either subsystem, an explicit synchronization mechanism may be provided between the subsystems 940, 950.

Hit testing: Hit testing decisions are often conditional on data regarding the visual hierarchy and properties of visible UI elements. In an embodiment, this consideration can be resolved by disallowing overlapping bounding rectangles, requiring a flat, 'hit test friendly' map of the UI. In an embodiment separate hit testing may provide the necessary information (object state, z-order, and listeners) to the low-latency subsystem. In an embodiment both the low- and high-latency subsystems may conduct hit testing in parallel. In an embodiment the low-latency subsystem conducts hit testing, and provides the results to the high-latency subsystem.

Conditional responses: Many interface visualizations are conditional not only on immediate user input, but on further decision-making logic defined in the application logic.

Figure 10:
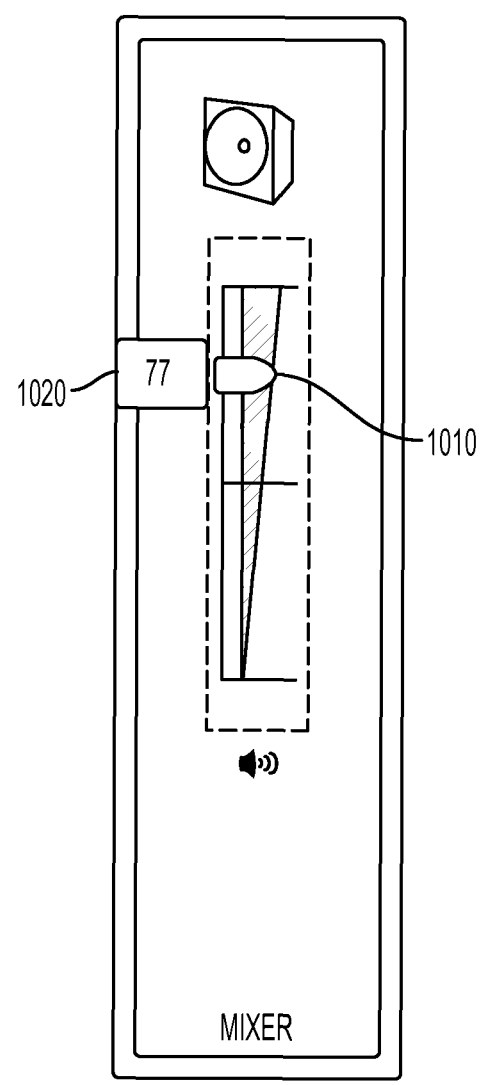
FIG. 10 shows the UI for a volume control. When dragging the slider, a tooltip appears showing a numeric representation of the current setting. This element is enabled using both the low-latency and high-latency system to provide a touch interaction where moving elements are accelerated, thus providing a low-latency experience.

Two illustrative examples of conditional response logic are as follows: Consider a credit-card purchase submission button, which is programmed to be disabled (to prevent double billing) when pressed, but only upon validation of the data entered into the form. In such a case, the behavior of the button is dependent not only on an immediate user interaction, but is further conditional on additional information and processing. Consider also linked visualizations, such as the one shown in FIG. 10. In this case, feedback is provided to the user not only by the UI element they are manipulating 1010, but also by a second UI element 1020. These examples could be programmed directly into a low-latency subsystem.

In an embodiment, the division between the high- and low-latency subsystems may be independent of any user interface elements. Indeed, the division of responsibility between the subsystems can be customized based on any number of factors, and would still be possible in systems that lack a user interface toolkit, or indeed in a system which included mechanisms to develop applications both within and without the use of a DD toolkit which might be available. In an embodiment, the division of responsibility between the two subsystems can be dynamically altered while the subsystems are running. In an embodiment, the UI toolkit itself may be included within the low-latency subsystem. The ability to customize responses can be provided to application developers in a number of ways without departing from the systems and methods herein described. In an embodiment, responses may be customized as parameters to be adjusted in UI controls. In an embodiment, responses may be customized by allowing for the ability to provide instructions directly to the low-latency subsystem, in code which itself executes in the low-latency subsystem, or in another high- or low-latency component. In an embodiment, the state of the low-latency subsystem could be set using data generated by application code, e.g., at runtime.

While many of the examples described above are provided in the context of a touch input, other embodiments are contemplated, including, without limitation, pen input, mouse input, indirect touch input (e.g., a trackpad), in-air gesture input, oral input and/or other input modalities. The architecture described would be equally applicable to any sort of user input event, including, without limitation, mixed input events (i.e., supporting input from more than one modality). In an embodiment, mixed input devices may result in the same number of events being generated for processing by each of the low- and high-latency subsystems. In an embodiment, mixed input devices would be differentiated in the number of events generated, thus, for example, touch input might have fewer events than pen input. In an embodiment, each input modality comprises its own low-latency subsystem. In an embodiment, in systems comprising multiple low-latency subsystems for multiple input modalities, the subsystems might communicate to coordinate their responses. In an embodiment, in systems comprising multiple low-latency subsystems for multiple input modalities, the multiple subsystems may share a common memory area to enable coordination.

Input Processing

In an embodiment of the invention, low-latency input data from the input hardware is minimally processed into a rapid stream of input events. This stream of events is sent directly to the low-latency sub-system for further processing. Events from this same stream may then be deleted, or the stream may be otherwise reduced or filtered, before being sent to the high-latency subsystem. Events may be generated at different rates for the low-latency subsystem 940 and high-latency subsystem 950 because the low-latency subsystem is capable of processing events faster than the high-latency subsystem, and sending events to the high-latency subsystem at a high rate may overwhelm that subsystem. The low- and high-latency subsystems' response to user input may therefore be independent but coordinated.

The reduction of events can be optimized. In an embodiment, representative events may be selected among candidate events based on criteria associated with one or more of the application, the UI element, the input device, etc. An example of this for pen input when the user is drawing digital ink strokes might include selecting events which fit best to the user's drawn stroke. Another example for speech input is to favor events where subsequent events in the output stream would have similar volume, thereby "evening out" the sound coming from the microphone. Another example for touch input is to favor events which would result in the output event stream having a consistent speed, providing more "smooth" output. This form of intelligent reduction acts as an intelligent filter, without reducing performance of the high-latency subsystem. In an embodiment, new events (e.g., consolidated events or pseudo-events) could be generated which represent an aggregate of other events in the input stream. In an embodiment, new events (e.g., corrected events, consolidated events or pseudo-events) may be generated that represent a more desirable input stream, e.g., a correction or smoothing. For example, for in-air gesture input, for every 10 events from the high-speed input device, the high-latency subsystem may be sent the same number or fewer events which provide an "average" of actual input events, thus smoothing the input and removing jitter. New events could also be generated which are an amalgam of multiple "desired" levels of various parameters of an input device. For example, if the intelligent reductions of the tilt and pressure properties of a stylus would result in the selection of different events, a single, new, event object could be created (or one or more existing event objects modified) to include the desired values for each of these properties.

In an embodiment, an IPU or low-latency subsystem system might be used to provide the high-latency system with processed input information. One or more of methods could be used to coordinate the activities of the two subsystems. These include:

a. In an embodiment, the low-latency subsystem can respond to all user input immediately, but wait for the user to stop the input (e.g. lifting a finger or pen, terminating a gesture) before providing the input to the high-latency system. This has an advantage of avoiding clogging the system during user interaction while still processing the totality of the data.

b. In an embodiment, the low-latency system can provide a reduced estimate of input in near real-time; and may optionally store a complete input queue that can be available to the high-latency system upon request.

c. In an embodiment, user feedback may be divided into two steps. The first, a low-latency feedback, would provide a rough, immediate representation of user input 1130 in FIG. 11. The second, a high-latency system response 1140, could replace the first 1130, whenever the high-latency system is able to compute a refined response, for example after lift-off of the pen 1150 tip. Alternatively, the high latency feedback could be continuously "catching up" to (and possibly subsuming) the low latency feedback.

d. In an embodiment, the low-latency system can infer simple gesture actions from the input stream, and thus generate gesture events which are included in the input queue in addition to, or replacing, the raw events.

e. In an embodiment, an IPU or low-latency subsystem can use multiple input positions to predict future input positions. This prediction can be passed along to the high-latency subsystem to reduce its effective latency.

f. In an embodiment, algorithms which may benefit from additional samples, or earlier detection, are executed in the IPU or low-latency subsystem. In an embodiment, the execution of these events can be limited in time. For example, the initial 50 events can be used to classify an input as a particular finger, or to differentiate between finger and pen inputs. In an embodiment, these algorithms can run continuously.

g. In an embodiment, the process of the low-latency subsystem passing a stream of events to the high-latency subsystem might be delayed in order to receive and process additional sequential or simultaneous related inputs which might otherwise be incorrectly regarded as unrelated inputs. For example, the letter "t" is often drawn as two separate, but related, strokes. In the normal course, the portion of the input stream passed from the low-latency to the high-latency system would include a "pen up" signal at the end of drawing the first line. In an embodiment, the reduction process waits for the very last frame of input within the sample window to pass along an "up" event, in case the pen is again detected on the display within the window, thus obviating the need for the event.

Hardware Architecture

Figure 12:
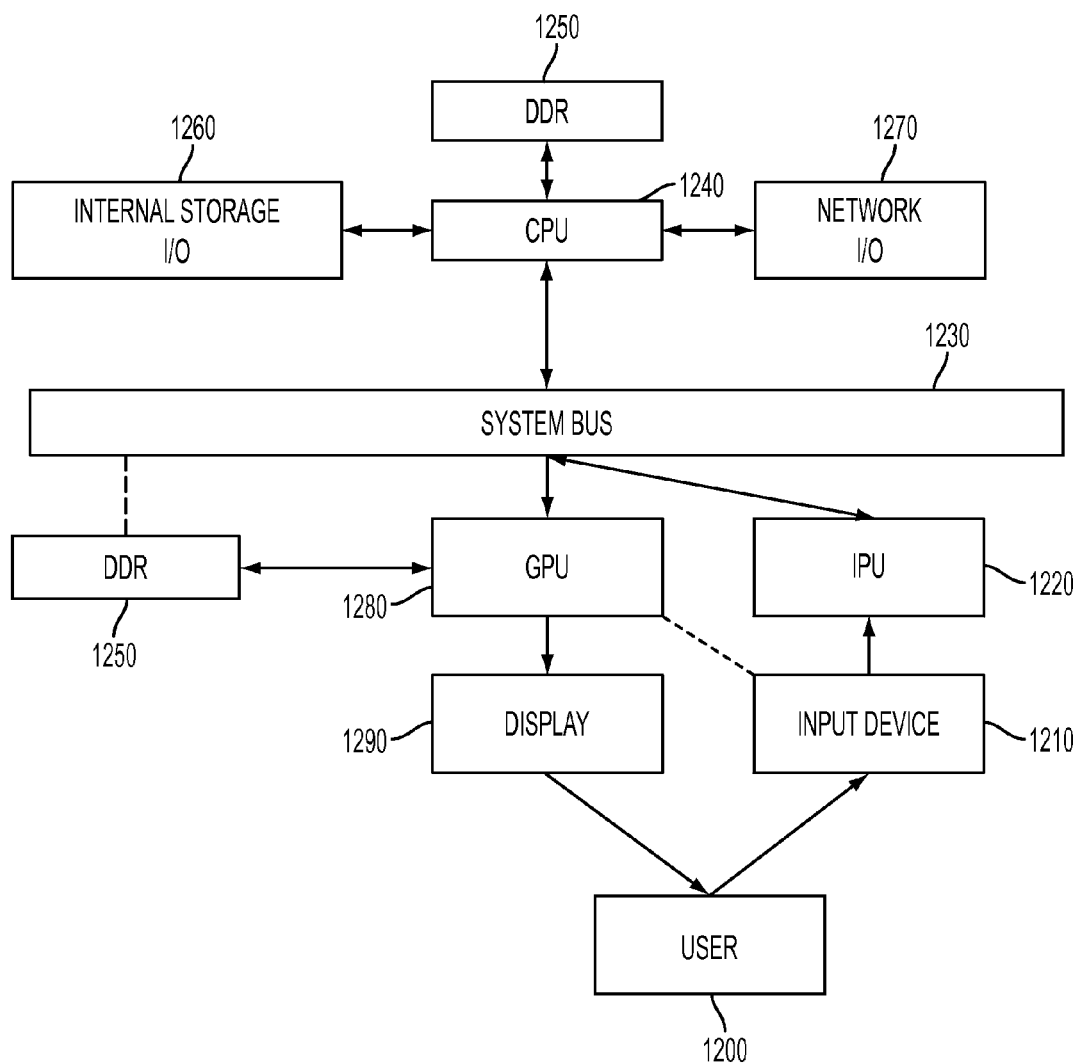
FIG. 12 shows an embodiment of the system where data flows through two overlapping paths through the components of the system to support both high- and low-latency feedback.

In an embodiment, data flows through two overlapping paths through the components of the system to support both high- and low-latency feedback. FIG. 12 shows one such system, which includes an Input Device 1210, an IPU 1220, a System Bus 1230, a CPU 1240 and a GPU 1280 connected to a Display 1290. A User 1200 performs input using the Input Device 1210. This input is sensed by the IPU 1220 which in various embodiments can be either an FPGA, ASIC, or additional software and hardware logic integrated into a GPU 1280, MPU or SoC. At this point, the control flow bifurcates and follows two separate paths through the system. For low-latency responses to input, the IPU 1220 sends input events through the System Bus 1230 to the GPU 1280, bypassing the CPU 1240. The GPU 1280 then rapidly displays feedback to the User 1200. For high-latency response to input, the IPU 1220 sends input events through the System Bus 1230 to the CPU 1240, which is running the graphical application and which may interact with other system components. The CPU 1240 then sends commands via the System Bus 1230 to the GPU 1280 in order to provide graphical feedback to the User 1200. The low-latency path from Input Device 1210 to IPU 1220 to System Bus 1230 to GPU 1280 is primarily hardware, and operates with low-latency. The high-latency path from Input Device 1210 to IPU 1220 to System Bus 1230 to CPU 1240 back to System Bus 1230 to GPU 1280 is high-latency due to the factors described earlier in this description. In a related embodiment, the Input Device 1210 communicates directly with the GPU 1280 and bypasses the System Bus 1230.

Figure 13:
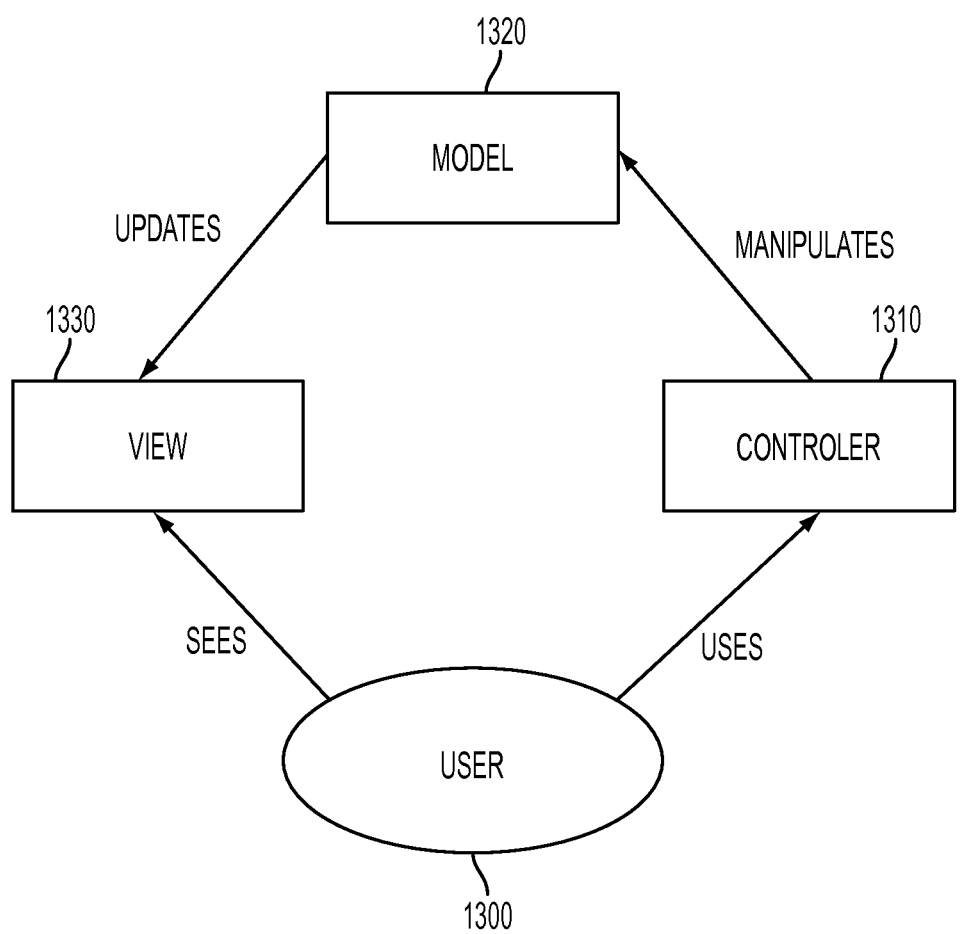
FIG. 13 shows a programming paradigm well known in the art called Model View Controller.

FIG. 13 shows a familiar programming paradigm called Model View Controller. In this paradigm, the User 1300 performs input on the Controller 1310, which in turn manipulates the Model 1320 based on this input. Changes in the Model 1320 result in changes to the View 1330, which is observed by the User 1300. Some of the latency addressed by the present invention is due to latency in the input, communication among these components, and display of the graphics generated by the View 1330 component.

Figure 14:
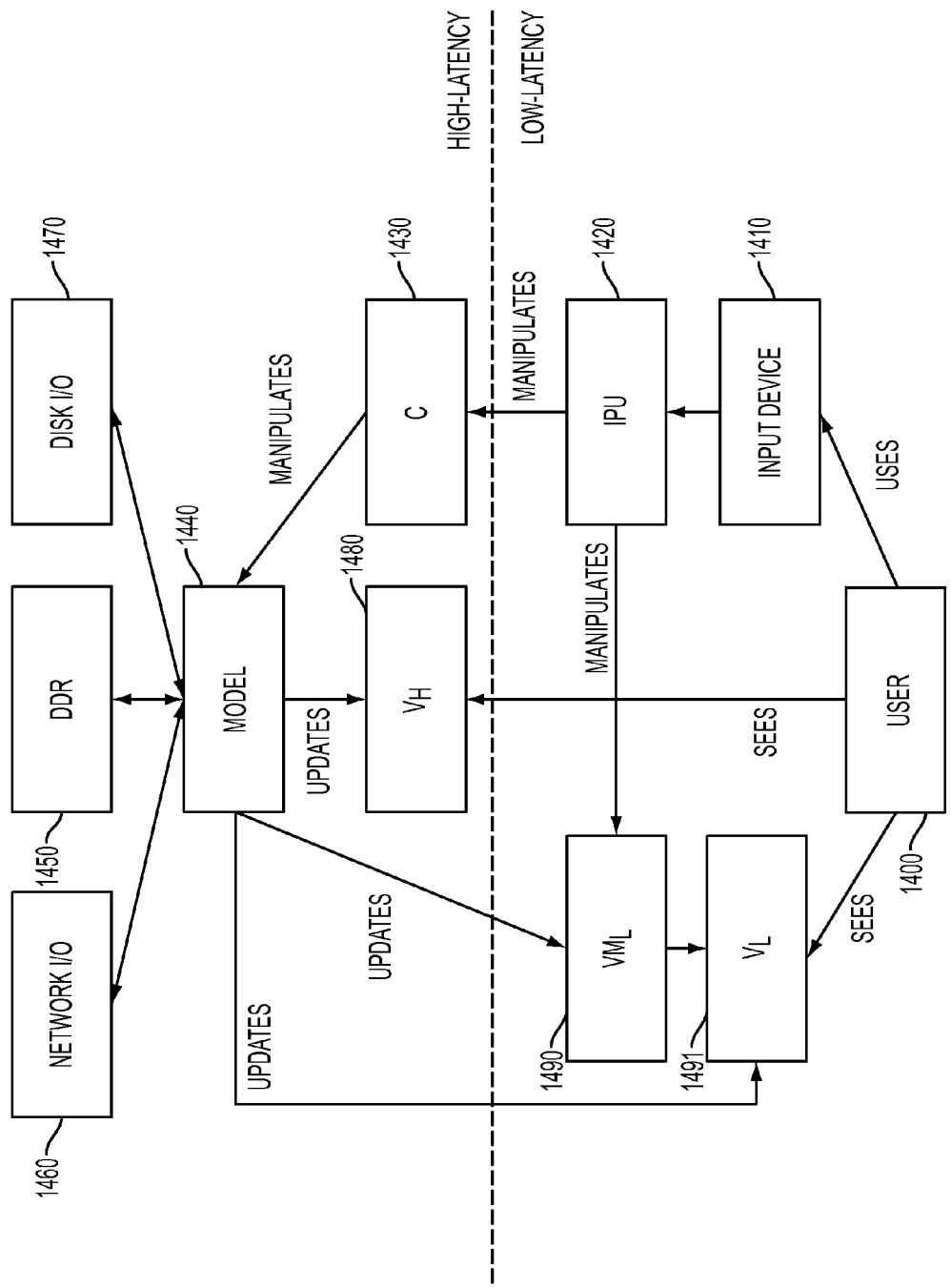
FIG. 14 shows an embodiment of the system's architecture that supports developing and running applications with blended high and low-latency responses to user input.

FIG. 14 shows an embodiment of an architecture that supports developing and running applications on a system with blended high- and low-latency responses to user input. The User 1400 performs input with the input device 1410. This input is received by the IPU 1420. The IPU 1420 sends input events simultaneously to the Controller 1430 running in the high-latency subsystem via traditional mechanisms and to the ViewModel(L) 1490 running in the low-latency subsystem. Input is handled by the Controller 1430, which manipulates the Model 1440 running in the high-latency subsystem, which may interact with data in volatile memory 1450, fixed storage 1470, network resources 1460, etc. (all interactions that introduce lag). Input events received by the ViewModel(L) 1490 result in changes to the ViewModel(L) which are reflected in changes to the View(L) 1491, which is seen by the User 1400. Changes to the Model 1440 result in changes to the high-latency subsystem's View(H) 1480, which is also seen by the User 1400. In an embodiment, these two types of changes seen by the user are shown on the same display. In an embodiment, these two types of changes are reflected to the user via other output modalities (such as, e.g., sound or vibration). In an embodiment, between inputs, the Model 1440 updates the state of the ViewModel(L) 1490 and View(L) 1491 so that the ViewModel(L) 1490 contains the needed data to present the GUI's components in the correct location on the system's display and so that the ViewModel(L) 1490 can correctly interpret input from the IPU 1420 in the context of the current state of the Model 1440; and so that the View(L) 1491 can correctly generate graphics for display in the context of the current state of the Model 1440.

By way of example, consider a touch-sensitive application with a button that among its functions responds to a user's touch by changing its appearance indicating that it has been activated. When the application is run, the application reads the location, size, and details of the appearance of the button from memory and compiled application code. The View(H) 1480 code generates the necessary graphics which are presented to the user to display this button. The Model 1440 updates the state of the ViewModel(L) 1490 to record that this graphical element is a button, and that it should change appearances from a "normal" appearance to a "pressed" appearance when touched. The Model 1440 also updates the state of the View(L) 1491 to record the correct appearance for the "normal" and "pressed" states in the ViewModel(L) 1490. This appearance may be a description of low-fidelity graphical elements, or a complete raster to display. In this example, the "pressed" state is represented by a displaying a white box around the button's position.

A User touches the touch-screen display, and input data describing that touch is received less than 1 ms later by the IPU 1420. The IPU 1420 creates an input event representing a touch-down event from the input data and sends this input event to the application Controller 1430. The Controller 1430 manipulates the Model 1440. In this case, the Controller 1430 is indicating to the Model 1440 that the button has been touched and that the application should perform whatever commands are associated with this button. At the same time that the IPU 1420 sends an event to the Controller 1430, it sends an event to the ViewModel(L) 1490 indicating that the button has been touched. The ViewModel(L) 1490 was previously instructed by the Model 1440 as to what to do in the case of a touch, and in this case it responds to the touch event by changing its state to "pressed". The View(L) 1491 responds to this change by displaying a white box around the button, feedback that corresponds to its "pressed" appearance. The change to the Model 1440 that the button is touched causes an update of View(H) 1480, so that it too reflects that button is now touched. The User, who see the output of both View(H) 1480 and View(L) 1491, sees the immediate feedback of their touch by View(L) 1491 followed a fraction of a second later by the feedback from View(H) 1480.

Throughout the text of this application, the word "event" is used to describe information describing attributes of user input. This term is used generally, and thus includes embodiments in which event driven architectures are employed (with actual event objects being passed between software elements), as well as more basic input streams in which the "event" being described is simply present in the stream of information. Such events may be, e.g., non-object-orient types of events or object-oriented types events.

Figure 15:
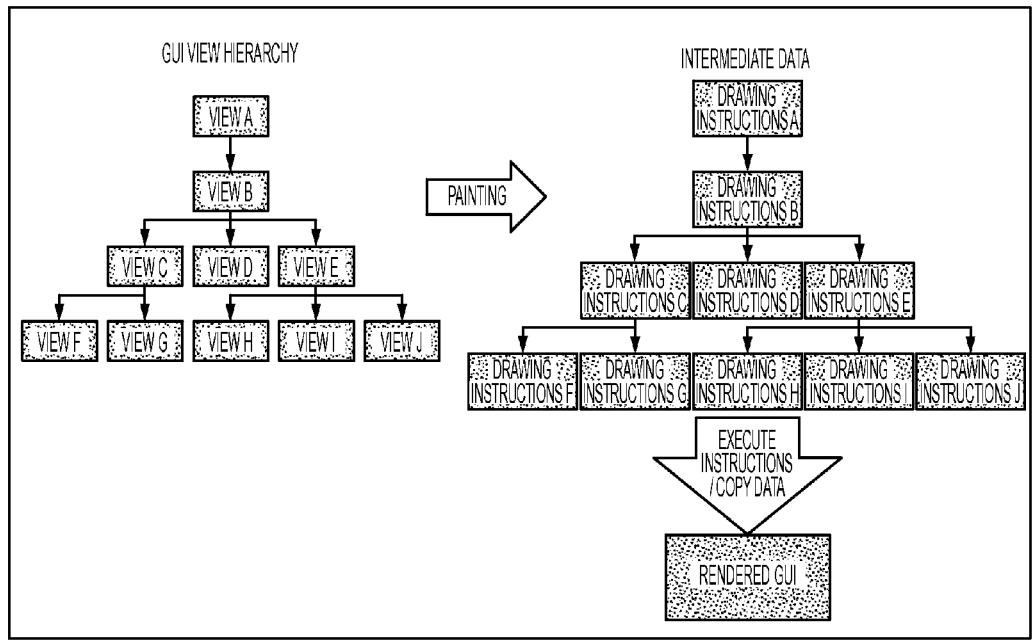
FIG. 15 is a block diagram illustrating GUI view and intermediate data hierarchies in accordance with prior art.

Low-Latency Visual Response to Input Via Pre-Generation of Alternative Graphical Representations of Application Elements and Input Handling on a Graphical Processing Unit Background FIG. 15 is a block diagram illustrating graphical user interface (GUI) view and intermediate data hierarchies in accordance with prior art. An application running on a CPU includes a number of GUI elements, typically, although not necessarily, arranged in a tree. These "views" (also called widgets, components, elements, etc.) may include familiar elements such as sliders, windows, buttons, panels, etc., each of which has a current state and associated application code to run when the element is acted upon by user input.

When the application updates any of its states and the changes to the visual appearance of the application need to be displayed to the user, the application performs a "paint" command (also called draw, render, etc. in some systems), which walks this tree (or other data structure: e.g., 'scene graph') and produces intermediate drawing data from the GUI elements in the application. This intermediate data may consist of individual bitmaps (a.k.a. rasters, pixel data) for each element in the application, may consist of drawing instructions to produce the final pixel (rendered) appearance of each element in the application, or may consist of any representation that allows a computer to produce pixels (or other fundamental graphical primitive as appropriate for the display technology) on a display that represent the application's visual appearance in memory (pixel data, Display-Lists, drawing instructions, vector data, etc.). In the example shown in FIG. 15, this intermediate data consists of drawing instructions that are executed to produce the final pixel appearance of the GUI elements. This intermediate data resides in memory and may be accessible to either the computer's CPU or dedicated graphical processing unit (GPU) or both.

Figure 16:
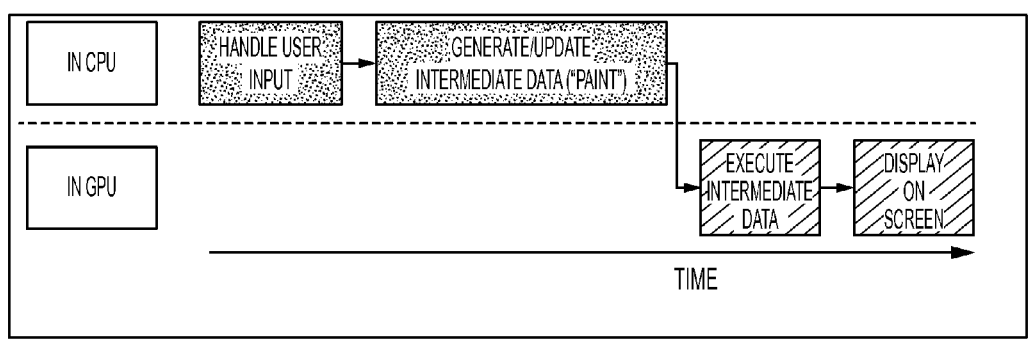
FIG. 16 is a timeline view illustrating the execution of intermediate data.

To produce the final rendered GUI, this intermediate data is executed or copied into a pixel buffer that is sent to the display and visible to the user. See FIG. 16.

In a system that includes both a CPU and a GPU for rendering, the process of handling user input and generating/updating the intermediate data (performed by the CPU) typically takes considerably longer than the process of executing the intermediate instructions to produce the final pixel buffer (performed by the GPU).

Figure 17:
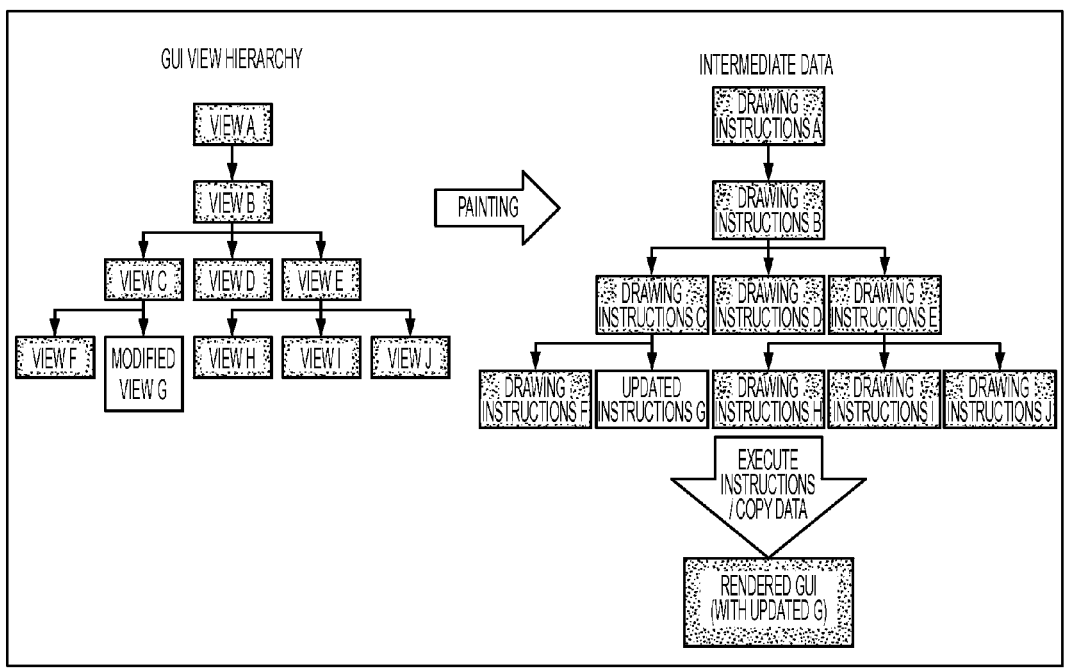
FIG. 17 is a block diagram illustrating GUI view and intermediate data hierarchies.

FIG. 17 shows how changes to the visual appearance of GUI elements are made visible to the user. In this example, the application running on the CPU has received input from the user that requires a change in the visual appearance of "View G". For this example, assume that View G is a button and that the user has pressed it, requiring the button to appear "pressed" on the display. The user input modifies the state of View G in the application, which triggers the "paint" command which produces updated intermediate data for G. To produce the final rendered GUI (including the new visual appearance of G), the intermediate data is executed or copied into a pixel buffer that is sent to the display and visible to the user. This display includes the modified appearance of View G.

While modern operating systems perform many steps to efficiently update only the intermediate data that requires updating, the process of receiving user input, modifying application state, and generating this intermediate data is still time consuming and introduces latency into the visual response to user input. Therefore it is desirable to create a system that improves upon the time required to display the visual response to input to the user of a GUI.

Low-Latency Visual Response to Input Via Pre-Generation of Alternative Graphical Representations of Application Elements We describe herein an invention in which the elements in a GUI are used to generate one or more intermediate data that correspond to one or more possible visual states for the GUI element. These multiple visual representations are paired with control logic that chooses the appropriate intermediate data to use when rendering the final pixel image to display to the user.

Figure 18:
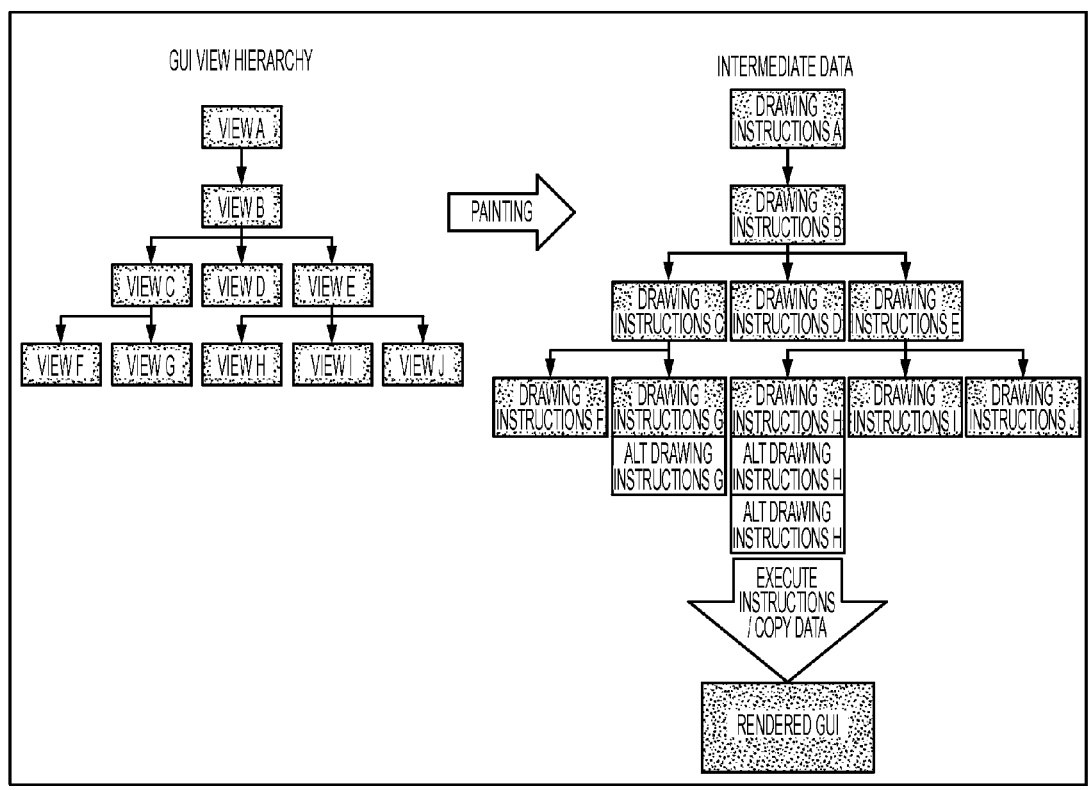
FIGS. 18-19 are block diagrams illustrating GUI view and intermediate data hierarchies in accordance with embodiments of the presently disclosed system and method.

FIG. 18 shows an embodiment of the present invention, in which each GUI element in the application's GUI produces one or more intermediate data depending on the type of element and the number of possible visual states of that element. In this example, View G and View H are the only views in this GUI that have multiple possible visual appearances, and View G generates two alternative intermediate data corresponding to two alternative visual appearances and View H generates three intermediate data for three possible visible appearances. In the preferred embodiment, the invention records an index that corresponds to the current alternative to use when executing the intermediate data to produce the final pixel buffer that is displayed to the user.

Figure 19:
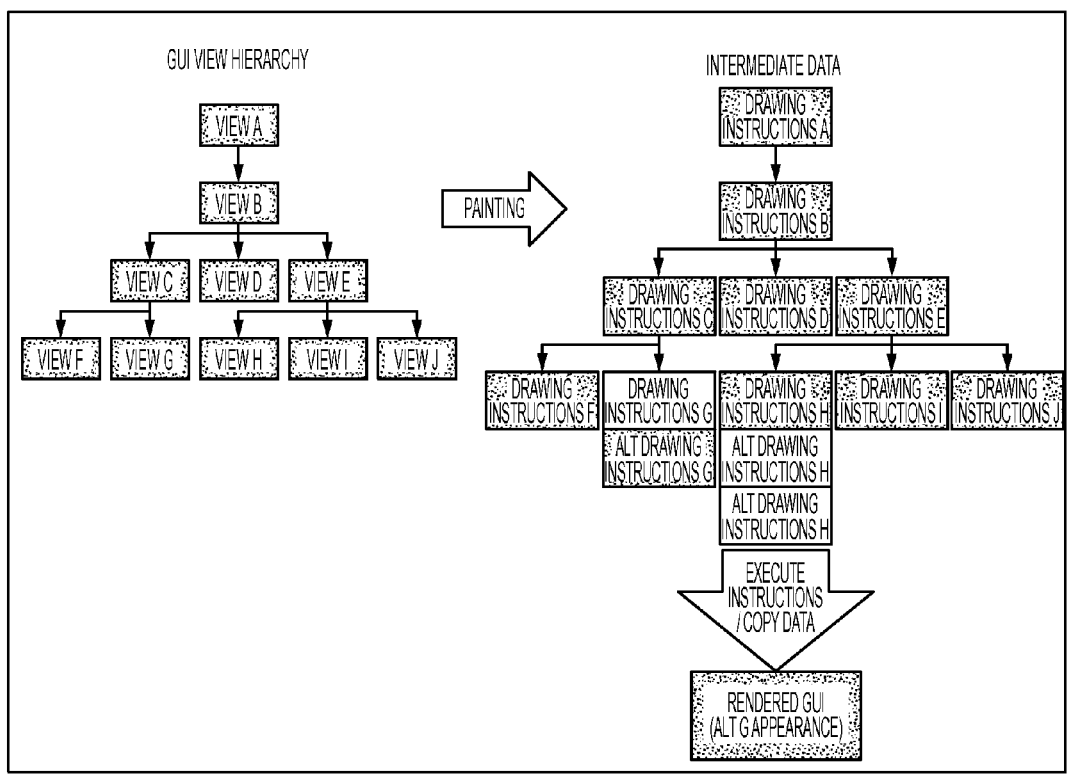

FIG. 19 shows the intermediate data with an updated index for View G. In this example, assume that View G is a button and that the "Drawing Instructions G" give instructions for drawing its unpressed appearance and that the "Alt Drawing Instructions G" give instructions for drawing its pressed appearance. In this example, when the user presses the button, the system updates the index for G such that the "Alt Drawing Instructions G" is selected. This selection ensures that View G appears correctly when the intermediate data is then executed or copied into a pixel buffer that is sent to the display and visible to the user. Because the drawing instructions for the elements in the GUI were pre-computed, the visual response to user input can occur very rapidly with low latency as there is no need to perform the time-consuming "paint" operation at that time.

Other examples of states of UI Views which might be tied to alternative drawing instructions include the current/maximized state of a window, pressed-unpressed states of any UI element, UI elements as they might appear when being affected by another element (eg: if one View is to pass over another and show a drop-shadow, the appearance of that shadow on the Views 'below' it), or alternative 'skins' that might apply in context (eg: undamaged and damaged versions of UI objects that might get 'hit' in a game). Indeed, any property of a View which might affect its visual appearance might be tied and pre-computed. Further still, properties whose values interact might provide still more alternative renderings (e.g., disabled and unpressed, disabled and pressed, etc.). Properties with a large number of possible values might be pre-computed with values which are known to be likely, for example based on whether a given alternative appearance represents a state that can be transitioned to from the current state directly), based on past user behavior, based on behavior of other users, or as explicitly indicated by the developer of the application.

In these examples, the view being drawn with alternative elements is a 'leaf' node in the tree. In some embodiments of the invention, the relevant view might be a non-leaf node, such as view E in FIG. 18 and FIG. 19. In such circumstances, the child nodes (and indeed, all descendants when the recursive nature of this example is appreciated) might or might not have alternative drawing instructions which are tied to the alternative drawing instructions of their parents. For example, if View E were a UI panel containing a collection of Views H, I, and J, one alternative drawing instruction for E might include giving it a 'disabled' appearance. Typically though not always in a GUI, if a parent View is set to disabled, then child views are as well. Thus, the alternative drawing instructions for View E that give it a 'disabled' appearance might contain a pointer to similar alternative instructions for Views H,I, and J to give them a similarly disabled appearance. This pointer (or other indicator) might be stored in some central registry, or any number of other places that would be known to the reader. In some embodiments, the root of a View tree (often but not always the Window in which it is contained) may be pre-computed, and thus some subset (or all) of the Views within the tree may be pre-computed as well. This would facilitate fast switching of the foreground window.

It should be appreciated that maintaining alternative drawing instructions may at some point become arduous. These instructions might be stored for later retrieval, for example at the time the application is compiled/prepared for distribution, at the time it is loaded onto the device, at the time that the program is first executed, at the time that a View is first placed into the scene, or at idle moments where spare computation cycles are available.

It should also be appreciated that alternative drawing instructions may include (or be included in) animations.

Animation of changes to the UI is known to assist the user with understanding transitions between states. In some embodiments, whole sets of alternative instructions may be pre-determined to speed animation.

In some embodiments, specific Views might be rendered *without* repainting any other Views (e.g., parent or children). This might require that the system render only the portion of the View not occluded by other views. The limiting of the portion of the element to be painted might be included in the relevant drawing instructions (and/or alternative drawing instructions). In some embodiments, whole alternative instructions may be included depending on differing areas of occlusion.

Input Handling in a Graphical Processing Unit

While the described invention significantly reduces latency in the visual response to user input, the computer's CPU is still responsible for receiving user input events from an input device, dispatching these events to the correct application, performing hit testing to send the event to the correct element in the GUI, running callbacks that may execute any amount of code as well as change the visual appearance of GUI elements, and so on.

Figure 20:
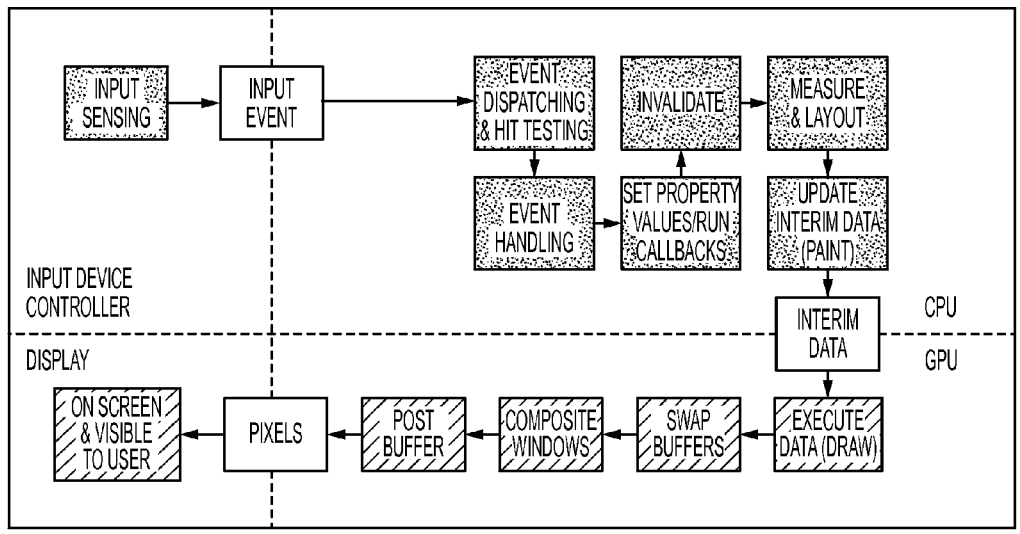
FIGS. 20-23 are block diagrams illustrating operation of a GPU, CPU, input device controller and display in accordance with embodiments of the presently disclosed system and method.

FIG. 20 shows a notional diagram outlining the steps taken to display the visual response to user input in the prior art. While individual systems in the prior art vary from the exact steps outlined in FIG. 20, they all follow the basic pattern of receiving and handling input in the CPU, updating the properties of graphical elements in the CPU, generating intermediate data in the CPU, and then handing off the final rendering to the GPU. For the purpose of this disclosure, one should assume that our invention applies to all of these variations.

Figure 21:
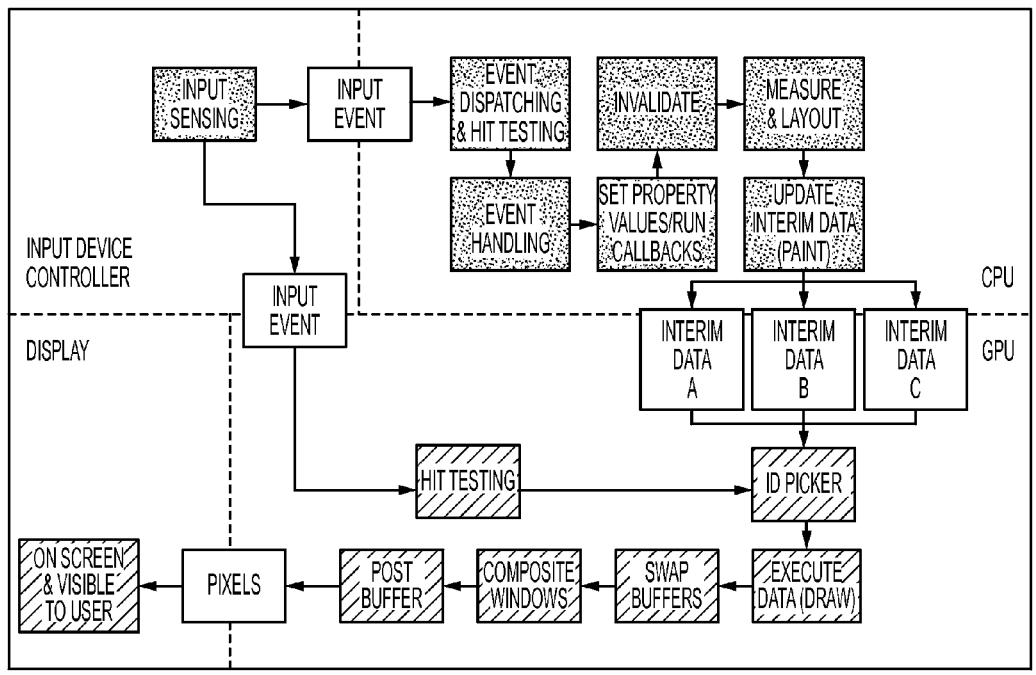

FIG. 21 shows an embodiment in which input events are sent not only to the CPU, but also to the GPU, where they are used to perform low-latency response to user input. In the GPU, a "Hit Testing" operation is first performed to determine which graphical element needs to be updated on the display. For graphical elements with multiple appearances (in FIG. 21, we see an element that has three alternative appearances, each represented with a separate set of intermediate data), an "Interim Data Picker" operation then determines which set of intermediate data to use when drawing the GUI and passing pixels to the display that is visible to the user.

Because the GPU and CPU run in parallel, these steps in the GPU can be performed very rapidly as the CPU works to "catch up" and perform the programmatic side effects of user input that are not related to the change in the visual appearance of GUI elements. The end result is a low-latency visual response to user input.

Though the figure shows some duplication between the CPU and GPU (e.g., hit testing is performed in both places), in some embodiments, this duplication is eliminated without reducing performance by performing those operations in the GPU, and passing their results back to the CPU. For example, input might be passed ONLY to the GPU, and hit testing might be done only in the GPU, with the result passed to the CPU for further processing.

Figure 22:
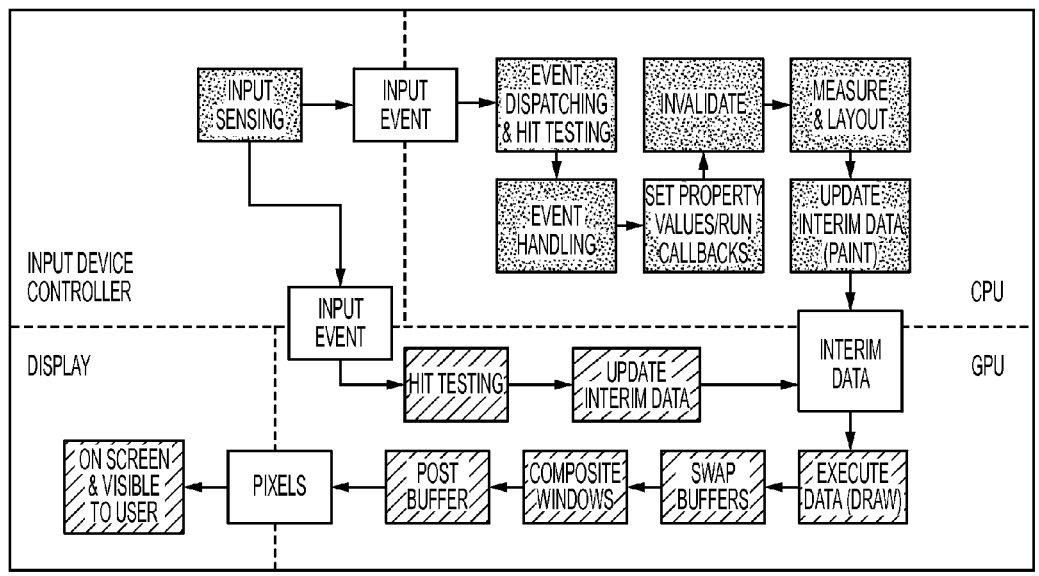

We have described the use of the invention to rapidly switch among alternative appearances of a GUI element in response to user input. FIG. 22 illustrates the rapid alteration of the visual appearance of a GUI element through the direct modification of its intermediate data structure in the GPU. Many common alterations of the appearance of a GUI element occur through the alteration of their location (e.g. scrolling, dragging, panning), size (e.g. resizing or scaling an element), rotation, skewing, or other visual property. As such, in this embodiment of the invention, the GPU receives user input and performs hit testing to determine which GUI element is being input upon by the user. Next, the interim data of the element being acted upon is directly modified in the GPU. For example, in the case of vertical scrolling, the Y position of the element can be directly updated in this step, eliminating the need to regenerate the entire interim data for that element. After the update, the execution of the interim data can continue and the GUI can be rendered and displayed on screen for the user to view.

In some embodiments, updates are limited to graphical transformations. In some embodiments, these transformations might be dependent on application logic. In some embodiments, this logic might be available only to the CPU, thus requiring 'check-in' which slows down interaction, or performing operations once in the GPU, but then later replacing them by the results of paint operations in the CPU. In other embodiments, mechanisms might exist to place application logic in the GPU by the developer of the application. Such mechanisms might include properties set on UI elements (eg: the maximum extent of a transformation, or a conditional operation such as allowing transformation in one direction but not another), the selection from among a set of predefined recipes, or indeed providing instructions, either in the GPU's own programming language, or another language which is translated to 'native' instructions. These instructions, specified by the application developer, could be executed following hit testing. In effect, these would amount to a form of event handling performed within the GPU.

In some embodiments, input handled by the GPU and CPU might result in conflicts. For example, the user might scroll past the end of a list if the GPU is not aware of its extents, which the CPU would catch in event handling and prevent. However, because GPU code executes more quickly than CPU, this prevention would come after the scrolling had occurred. In some embodiments, basic logic about common UI Views would be encoded as instructions for the GPU, preventing many such conflicts from occurring in the first place. However, in embodiments where application developers are able to write CPU code to change the appearance and/or behavior of a View, conflicts may be inevitable. In such embodiments, mechanisms might be included to mitigate them. These might include providing an 'event' callback to one or both of CPU and GPU portions to allow the developer to specify how conflicts should be handled. These might also include policies (either prescribed or developer-selectable) about they are handled. These policies might include the invocation of animations or other graphical effects to transition from the 'illegal' GPU-created state to the 'proper' CPU-created state (or vice versa).

Other examples of conflicts might include processing of the input stream. For example, some interactive systems include mechanisms for processing input to determine if a gesture has occurred. In some embodiments, the gesture-detection mechanism might reside in the GPU, in others in the CPU, in others, both places, in others, in another position within the system. Conflict resolution in this instance might use similar mechanisms to those described above. If a gesture is detected, that fact is encoded in state information, and propagated to one or both of the CPU and GPU representations. In some embodiments, this state information might be passed directly or through other means of copying memory. In other embodiments, it might be propagated through the passing of instructions for execution to one or both of the CPU and GPU.

As hit testing and the modification of the intermediate data are operations that can be performed extremely quickly on a GPU, the result of this invention is the low-latency visual response to user input to modify the visual properties of GUI elements.

Figure 23:
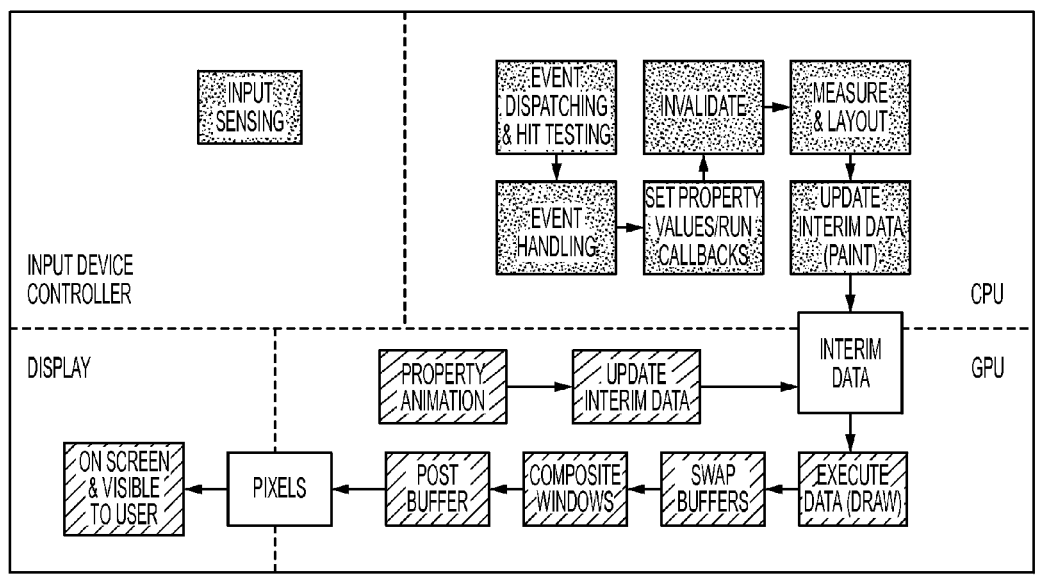

FIG. 23 shows an alternative embodiment in which the GPU modifies the interim data in response to a running animation rather than in response to user input. In this case, a process "Property Animation" performs updates to the interim data at regular time intervals to affect a visual change in the appearance of the GUI element over time. After each update, the GPU executes the interim data and the display is updated for the user to view. This embodiment frees the CPU from running the animation, and thus the animation is not hindered when the CPU's resources are consumed by other facets of the OS.

In general, any modification of the actual or apparent state of a View (that is, the state shown to the user) by one 'side' of the CPU/GPU will require some degree of coordination between the two sides. In some embodiments, this coordination takes place by passing state information between the two, possibly using conflict resolution mechanisms (such as those described above) to determine and set the 'correct' state, and to transition what is shown on screen to that correct state, if needed. In other embodiments, state conflicts are resolved by the passing of instructions from one side to the other (or by some conflict resolution unit). In other embodiments, the state might simply be copied whole from one side to the other. In still other embodiments, multiple instances of an application might be instantiated, each with a different state, with one of those instances 'selected' to overwrite current state (for example according to the policies described above).

The present system and methods are described above with reference to block diagrams and operational illustrations of methods and devices comprising a computer system capable of receiving and responding to user input. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While the invention has been particularly shown and described with reference to a preferred embodiment thereof, it will be understood by those skilled in the art that various changes in form and details may be made therein without departing from the spirit and scope of the invention.

What is claimed is:

1. A method for providing a visual response to input with reduced latency in a computing device, comprising:

computing a plurality of alternative sets of intermediate instructions for a first graphical user interface element, each alternative set of intermediate instructions comprising data useful to produce a visual representation of the graphical user interface element;

storing the plurality of alternative sets of intermediate instructions for the first graphical user interface element in a memory;

storing at least one set of intermediate instructions for a second graphical user interface element in the memory;

creating an index identifying a first one of the plurality of alternative sets of intermediate instructions for the first graphical user interface element to use in forming a final pixel image;

using the index, the first set of alternative intermediate instructions for the graphical user interface element, and the intermediate instructions for the second graphical user interface element to create a first final pixel image for display to a user, the first final pixel image including the first and second graphical user interface elements;

receiving user input from a user input device;

in response to the user input, modifying the index to include an identification of a second one of the plurality of alternative sets of intermediate instructions for the first graphical user interface element;

using the modified index, the second alternative set of intermediate instructions for the first graphical user interface element, and the intermediate instructions for the second graphical user interface element to create a final pixel image for display to a user, the final pixel image including the first and second graphical user interface elements.

2. The method of claim 1, wherein the plurality of alternative sets of intermediate instructions comprises a plurality of alternative sets of drawing instructions.

3. The method of claim 2, wherein the step of using the first set of alternative intermediate instructions to create a first final pixel image for display to a user comprises executing a first alternative set of drawing instructions.

4. The method of claim 1, wherein the plurality of alternative sets of intermediate instructions comprises a plurality of alternative sets of pixel data.

5. The method of claim 4, wherein the step of using the first set of alternative intermediate instructions to create a first final pixel image for display to a user comprises copying a set of rendered representations of pixels to a pixel buffer.

6. The method of claim 1, wherein the plurality of alternative sets of intermediate instructions comprises a plurality of alternative sets of properties of a view of the first graphical user interface element which affects its visual appearance.

7. The method of claim 1, wherein the plurality of alternative sets of intermediate instructions comprises a plurality of alternative sets of vector data.

8. The method of claim 1, wherein the plurality of alternative sets of intermediate instructions comprises a plurality of alternative sets of raster data.

9. The method of claim 1, wherein the plurality of alternative sets of intermediate instructions comprises a plurality of alternative display lists.

10. The method of claim 1, wherein the first user interface element is a button, the first alternative set of intermediate instructions comprises a representation of the button in a non-pressed state, and the second alternative set of intermediate instructions comprises a representation of the button in a pressed state.

11. The method of claim 1, wherein the first user interface element is a window, the first alternative set of intermediate instructions comprises a representation of the window in a non-maximized state, and the second alternative set of intermediate instructions comprises a representation of the window in a maximized state.

12. The method of claim 1, wherein the first alternative set of intermediate instructions comprises a representation of the first user interface element when not being affected by another user interface element and the second alternative set of intermediate instructions comprises a representation of the first user interface element when being affected by the other user interface element.

13. The method of claim 1, wherein the first user interface element has a plurality of alternative visual states and the second user interface element has a single visual state.

14. The method of claim 1, wherein the first and second user interface elements each have a plurality of alternative visual states.

15. The method of claim 1, wherein the first user interface element is a button, the first alternative set of intermediate instructions comprises a representation of the button in a disabled state, and the second alternative set of intermediate instructions comprises a representation of the button in an enabled state.

16. The method of claim 1, further comprising more than two alternative sets of intermediate instructions.

17. The method of claim 1, wherein the second alternative set of intermediate instructions comprises a pointer to alternative instructions for a third graphical user interface element.

18. The method of claim 17, wherein the third graphical user interface element is a child of the first graphical user interface element.

19. The method of claim 1, wherein at least one of the first alternative set of intermediate instructions and the second alternative set of intermediate instructions comprises a representation of the first user interface element when the user is scrolling.

20. The method of claim 1, wherein at least one of the first alternative set of intermediate instructions and the second alternative set of intermediate instructions comprises a representation of the first user interface element when the user is panning.

21. The method of claim 1, wherein at least one of the first alternative set of intermediate instructions and the second alternative set of intermediate instructions comprises a representation of the first user interface element when the first user interface element is being dragged.

22. The method of claim 1, wherein the step of computing a plurality of alternative sets of intermediate instructions is performed by a graphics processing unit.

23. The method of claim 1, wherein the step of computing a plurality of alternative sets of intermediate instructions is performed by a central processing unit.

24. The method of claim 1, wherein the step of creating an index is performed by a graphics processing unit.

25. The method of claim 1, wherein the step of creating an index is performed by a central processing unit.

26. The method of claim 1, wherein the step of using the index is performed by a graphics processing unit.

27. The method of claim 1, wherein the step of using the index is performed by a central processing unit.

28. The method of claim 1, wherein the first user interface element is the visible region of a scroll view, the first alternative set of intermediate instructions comprises a representation of the next region of the scrollview, and the second alternative set of intermediate instructions comprises a representation of the previous region of the scrollview.

29. The method of claim 1, wherein the alternative set of intermediate instructions comprises representations of at least one selected from the set consisting of: a button in a non-pressed state, a button in a pressed state, a control in a checked state, a control in an unchecked state, a button in an enabled state, a button in a disabled state, an element in an active state, an element in an inactive state, an element in a hovered over state, an element in a not hovered over state, an element in an expanded state, an element in a not expanded state, an element with focus, an element without focus, an element in a visible state, and an element in an invisible state.

30. The method of claim 1, wherein the alternative sets of intermediate instructions comprise representations in different areas of the display.

31. The method of claim 1, wherein the alternative sets of intermediate instructions comprise representations of different shapes or sizes of the user interface element.

32. The method of claim 1, wherein the alternative set of intermediate instructions comprises a previous state of the user interface element.

33. The method of claim 1, wherein the alternative set of intermediate instructions comprises a possible future state of the user interface element.

34. A method for providing a visual response to input with reduced latency in a computing device, comprising:
rendering a plurality of alternative sets of intermediate instructions for a first graphical user interface element, each alternative set of intermediate instructions representing an alternative visual representation of the graphical user interface element;
storing the plurality of alternative sets of intermediate instructions for the first graphical user interface element in a memory;
storing at least one set of intermediate instructions for a second graphical user interface element in the memory;
creating an index identifying a first one of the plurality of alternative sets of intermediate instructions for the first graphical user interface element to use in forming a final pixel image;
using the index, the first set of alternative intermediate instructions for the graphical user interface element, and the intermediate instructions for the second graphical user interface element to create a first final pixel image for display to a user, the first final pixel image including the first and second graphical user interface elements;
receiving user input from a user input device;
in response to the user input, modifying the index to include an identification of a second one of the plurality of alternative sets of intermediate instructions for the first graphical user interface element;
using the modified index, the second alternative set of intermediate instructions for the first graphical user interface element, and the intermediate instructions for the second graphical user interface element to create a final pixel image for display to a user, the final pixel image including the first and second graphical user interface elements.

35. The method of claim 34, wherein the step of using the first set of alternative intermediate instructions to create a first final pixel image for display to a user comprises copying a set of rendered representations of pixels to a pixel buffer.

36. The method of claim 34, wherein the plurality of alternative sets of intermediate instructions comprises a plurality of alternative sets of vector data.

37. The method of claim 34, wherein the plurality of alternative sets of intermediate instructions comprises a plurality of alternative sets of raster data.

38. The method of claim 34, wherein the first user interface element is a button, the first alternative set of intermediate instructions comprises a representation of the button in a non-pressed state, and the second alternative set of intermediate instructions comprises a representation of the button in a pressed state.

39. The method of claim 34, wherein the first user interface element is a window, the first alternative set of intermediate instructions comprises a representation of the window in a non-maximized state, and the second alternative set of intermediate instructions comprises a representation of the window in a maximized state.

40. The method of claim 34, wherein the first alternative set of intermediate instructions comprises a representation of the first user interface element when not being affected by another user interface element and the second alternative set of intermediate instructions comprises a representation of the first user interface element when being affected by the other user interface element.

41. The method of claim 34, wherein the first user interface element has a plurality of alternative visual states and the second user interface element has a single visual state.

42. The method of claim 34, wherein the first and second user interface elements each have a plurality of alternative visual states.

43. The method of claim 34, wherein the first user interface element is a button, the first alternative set of intermediate instructions comprises a representation of the button in a disabled state, and the second alternative set of intermediate instructions comprises a representation of the button in an enabled state.

44. The method of claim 34, further comprising more than two alternative sets of intermediate instructions.

45. The method of claim 34, wherein the second alternative set of intermediate instructions comprises a pointer to alternative instructions for a third graphical user interface element.

46. The method of claim 45, wherein the third graphical user interface element is a child of the first graphical user interface element.

47. The method of claim 34, wherein at least one of the first alternative set of intermediate instructions and the second alternative set of intermediate instructions comprises a representation of the first user interface element when the user is scrolling.

48. The method of claim 34, wherein at least one of the first alternative set of intermediate instructions and the second alternative set of intermediate instructions comprises a representation of the first user interface element when the user is panning.

49. The method of claim 34, wherein at least one of the first alternative set of intermediate instructions and the second alternative set of intermediate instructions comprises a representation of the first user interface element when the first user interface element is being dragged.

50. The method of claim 34, wherein the step of computing a plurality of alternative sets of intermediate instructions is performed by a graphics processing unit.

51. The method of claim 34, wherein the step of computing a plurality of alternative sets of intermediate instructions is performed by a central processing unit.

52. The method of claim 34, wherein the step of creating an index is performed by a graphics processing unit.

53. The method of claim 34, wherein the step of creating an index is performed by a central processing unit.

54. The method of claim 34, wherein the step of using the index is performed by a graphics processing unit.

55. The method of claim 34, wherein the step of using the index is performed by a central processing unit.

56. The method of claim 34, wherein the first user interface element is the visible region of a scroll view, the first alternative set of intermediate instructions comprises a representation of the next region of the scrollview, and the second alternative set of intermediate instructions comprises a representation of the previous region of the scrollview.

57. The method of claim 34, wherein the alternative set of intermediate instructions comprises representations of at least one selected from the set consisting of: a button in a non-pressed state, a button in a pressed state, a control in a checked state, a control in an unchecked state, a button in an enabled state, a button in a disabled state, an element in an active state, an element in an inactive state, an element in a hovered over state, an element in a not hovered over state, an element in an expanded state, an element in a not expanded state, an element with focus, an element without focus, an element in a visible state, and an element in an invisible state.

58. The method of claim 34, wherein the alternative sets of intermediate instructions comprise representations in different areas of the display.

59. The method of claim 34, wherein the alternative sets of intermediate instructions comprise representations of different shapes or sizes of the user interface element.

60. The method of claim 34, wherein the alternative set of intermediate instructions comprises a previous state of the user interface element.

61. The method of claim 34, wherein the alternative set of intermediate instructions comprises a possible future state of the user interface element.

62. A method for providing a visual response to input with reduced latency in a computing device, comprising:
 computing a plurality of alternative sets of intermediate instructions for a first graphical user interface element, each alternative set of intermediate instructions comprising drawing instructions for rendering an alternative visual representation of the graphical user interface element;
 storing the plurality of alternative sets of intermediate instructions for the first graphical user interface element in a memory;
 storing at least one set of intermediate instructions for a second graphical user interface element in the memory;
 creating an index identifying a first one of the plurality of alternative sets of intermediate instructions for the first graphical user interface element to use in forming a final pixel image;
 using the index, the first set of alternative intermediate instructions for the graphical user interface element, and the intermediate instructions for the second graphical user interface element to render a first final pixel image for display to a user, the first final pixel image including the first and second graphical user interface elements;
 receiving user input from a user input device;
 in response to the user input, modifying the index to include an identification of a second one of the plurality of alternative sets of intermediate instructions for the first graphical user interface element;
 using the modified index, the second alternative set of intermediate instructions for the first graphical user interface element, and the intermediate instructions for the second graphical user interface element to create a final pixel image for display to a user, the final pixel image including the first and second graphical user interface elements.

63. The method of claim 62, wherein the step of using the first set of alternative intermediate instructions to create a first final pixel image for display to a user comprises executing a first alternative set of drawing instructions.

64. The method of claim 62, wherein the plurality of alternative sets of intermediate instructions comprises a plurality of alternative sets of vector data.

65. The method of claim 62, wherein the plurality of alternative sets of intermediate instructions comprises a plurality of alternative sets of raster data.

66. The method of claim 62, wherein the plurality of alternative sets of intermediate instructions comprises a plurality of alternative display lists.

67. The method of claim 62, wherein the first user interface element is a button, the first alternative set of intermediate instructions comprises a representation of the button in a non-pressed state, and the second alternative set of intermediate instructions comprises a representation of the button in a pressed state.

68. The method of claim 62, wherein the first user interface element is a window, the first alternative set of intermediate instructions comprises a representation of the window in a non-maximized state, and the second alternative set of intermediate instructions comprises a representation of the window in a maximized state.

69. The method of claim 62, wherein the first alternative set of intermediate instructions comprises a representation of the first user interface element when not being affected by another user interface element and the second alternative set of intermediate instructions comprises a representation of the first user interface element when being affected by the other user interface element.

70. The method of claim 62, wherein the first user interface element has a plurality of alternative visual states and the second user interface element has a single visual state.

71. The method of claim 62, wherein the first and second user interface elements each have a plurality of alternative visual states.

72. The method of claim 62, wherein the first user interface element is a button, the first alternative set of intermediate instructions comprises a representation of the button in a disabled state, and the second alternative set of intermediate instructions comprises a representation of the button in an enabled state.

73. The method of claim 62, further comprising more than two alternative sets of intermediate instructions.

74. The method of claim 62, wherein the second alternative set of intermediate instructions comprises a pointer to alternative instructions for a third graphical user interface element.

75. The method of claim 74, wherein the third graphical user interface element is a child of the first graphical user interface element.

76. The method of claim 62, wherein at least one of the first alternative set of intermediate instructions and the second alternative set of intermediate instructions comprises a representation of the first user interface element when the user is scrolling.

77. The method of claim 62, wherein at least one of the first alternative set of intermediate instructions and the second alternative set of intermediate instructions comprises a representation of the first user interface element when the user is panning.

78. The method of claim 62, wherein at least one of the first alternative set of intermediate instructions and the second alternative set of intermediate instructions comprises a representation of the first user interface element when the first user interface element is being dragged.

79. The method of claim 62, wherein the step of computing a plurality of alternative sets of intermediate instructions is performed by a graphics processing unit.

80. The method of claim 62, wherein the step of computing a plurality of alternative sets of intermediate instructions is performed by a central processing unit.

81. The method of claim 62, wherein the step of creating an index is performed by a graphics processing unit.

82. The method of claim 62, wherein the step of creating an index is performed by a central processing unit.

83. The method of claim 62, wherein the step of using the index is performed by a graphics processing unit.

84. The method of claim 62, wherein the step of using the index is performed by a central processing unit.

85. The method of claim 62, wherein the first user interface element is the visible region of a scroll view, the first alternative set of intermediate instructions comprises a representation of the next region of the scrollview, and the second alternative set of intermediate instructions comprises a representation of the previous region of the scrollview.

86. The method of claim 62, wherein the alternative set of intermediate instructions comprises representations of at least one selected from the set consisting of: a button in a non-pressed state, a button in a pressed state, a control in a checked state, a control in an unchecked state, a button in an enabled state, a button in a disabled state, an element in an active state, an element in an inactive state, an element in a hovered over state, an element in a not hovered over state, an element in an expanded state, an element in a not expanded state, an element with focus, an element without focus, an element in a visible state, and an element in an invisible state.

87. The method of claim 62, wherein the alternative sets of intermediate instructions comprise representations in different areas of the display.

88. The method of claim 62, wherein the alternative sets of intermediate instructions comprise representations of different shapes or sizes of the user interface element.

89. The method of claim 62, wherein the alternative set of intermediate instructions comprises a previous state of the user interface element.

90. The method of claim 62, wherein the alternative set of intermediate instructions comprises a possible future state of the user interface element.

91. A method for providing an auditory response to input with reduced latency in a computing device, comprising:
computing a plurality of alternative sets of intermediate instructions for a first user interface element, each alternative set of intermediate instructions comprising data useful to produce an auditory output with respect to that user interface element;
storing the plurality of alternative sets of intermediate instructions for the first user interface element in a memory;
storing at least one set of intermediate instructions for a second user interface element in the memory;
creating an index identifying a first one of the plurality of alternative sets of intermediate instructions for the first user interface element to use in forming a final sound;

using the index, the first set of alternative intermediate instructions for the user interface element, and the intermediate instructions for the second graphical user interface element to create a first final sound for display to a user, the first final sound including the sounds of the first and second user interface elements;

receiving user input from a user input device;

in response to the user input, modifying the index to include an identification of a second one of the plurality of alternative sets of intermediate instructions for the first user interface element;

using the modified index, the second alternative set of intermediate instructions for the first user interface element, and the intermediate instructions for the second user interface element to create a final sound for output to a user, the final sound including the sounds from the first and second user interface elements.

* * * * *